United States Patent
Ozawa et al.

(10) Patent No.: US 7,770,501 B2
(45) Date of Patent: Aug. 10, 2010

(54) MITER SAW HAVING COMPACT GEAR CASE AT CUTTING PORTION

(75) Inventors: Hiromi Ozawa, Hitachinaka (JP); Kouji Takase, Hitachinaka (JP); Hiroyuki Saitou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 352 days.

(21) Appl. No.: 11/438,361

(22) Filed: May 23, 2006

(65) Prior Publication Data
US 2006/0266186 A1   Nov. 30, 2006

(30) Foreign Application Priority Data
May 27, 2005   (JP)   ............................ P2005-155663

(51) Int. Cl.
*B23D 45/04* (2006.01)
(52) U.S. Cl. .......................................... 83/473; 83/490
(58) Field of Classification Search ................. 83/471.3, 83/473, 490, 581
See application file for complete search history.

(56) References Cited

U.S. PATENT DOCUMENTS 1,679,772 A * 8/1928 Johnson ................. 29/898.048
5,357,834 A * 10/1994 Ito et al. ..................... 83/471.3
6,971,298 B2   12/2005 Ushiwata et al.

FOREIGN PATENT DOCUMENTS

| CN | 1418766 | 5/2003 |
| JP | 58-181045 | 12/1983 |
| JP | 2003-145501 | 5/2003 |

OTHER PUBLICATIONS

Japanese Office Action dated Jan. 13, 2010; Application No. 2005-155663; pp. 1-3. English translation of Office Action—pp. 1-3.

* cited by examiner

*Primary Examiner*—Kenneth E. Peterson
(74) *Attorney, Agent, or Firm*—Antonelli, Terry, Stout & Kraus, LLP.

(57) ABSTRACT

A miter saw having a cutting portion movable toward and away from a base and laterally tiltable for bevel cutting. A gear case is provided at the cutting portion and is positioned at one lateral side of the cutting portion. A bearing holder is provided in the gear case for holding a bearing which rotatably supports a spindle for a circular saw blade. The bearing holder has a thickness smaller than an axial length of the bearing. A first bearing nip member in contact with one axial end of the bearing is fixed to one side of the bearing holder, and a second bearing nip member in contact with another axial end of the bearing is fixed to another side of the bearing holder. These nip members are made from a material having a mechanical strength higher than that of the bearing holder.

8 Claims, 18 Drawing Sheets

MITER SAW HAVING COMPACT GEAR CASE AT CUTTING PORTION

BACKGROUND OF THE INVENTION

The present invention relates to a miter saw, and more particularly, to a miter saw having a compact gear case at a cutting portion.

In a miter saw having a cutting portion provided with a circular saw blade, cutting operation is performed by pivotally moving the cutting portion toward and away from a base portion on which a workpiece is mounted. A power transmission mechanism is provided in the cutting portion for rotating the circular saw blade. The mechanism includes an output shaft fixing the circular saw blade, and gears and pulleys those drivingly connecting the output shaft to a power source such as a motor. Since the power transmission mechanism is disposed nearby a rotation shaft of the circular saw blade, a portion of the cutting portion surrounding the power transmission mechanism may abut against the workpiece during cutting operation, to lower cutting performance.

In a recent miter saw, a bevel cutting at an acute angle between a side surface of the circular saw blade and an upper surface of the base portion is achievable by laterally tiltingly moving the cutting portion. Therefore, the portion of the cutting portion surrounding the power transmission mechanism may abut against the workpiece if the cutting portion is tilted in a lateral direction which is coincident with a projecting direction of the power transmission mechanism from one lateral side of the cutting portion. Therefore, bevel cutting to a thick workpiece my not be easily achievable.

U.S. Pat. No. 6,971,298 discloses a miter saw having a compact power transmission mechanism based on an improvement on the geometrical relationship among shafts, pulleys, and gears those constituting a power transmission mechanism in order to avoid interference between the cutting portion and a workpiece.

However, there is still a problem of interference between the cutting portion and the workpiece in the disclosed miter saw when the cutting portion is laterally tilted in a direction coincident with a projecting direction of the power transmission mechanism from one lateral side of the cutting portion in comparison with a case when the cutting portion is tilted in an opposite lateral direction opposite to the projecting direction of the power transmission mechanism. Further, the bevel cutting when the cutting portion is laterally tilted in the direction coincident with the projecting direction of the power transmission mechanism cannot be performed with respect to a specific standardized member.

SUMMARY OF THE INVENTION

It is therefore an object of the present invention is to provide a miter saw capable of avoiding mechanical interference between the cutting portion and a workpiece.

This and other objects of the present invention will be attained by a miter saw including a base portion, and a cutting portion. A workpiece is to be mounted on the base portion. The cutting portion supports a circular saw blade and is movable toward and away from the base portion. The cutting portion includes a gear case having a bearing holder portion, a motor, a power transmission mechanism, and a bearing. The bearing holder portion includes a bearing holder, a first bearing nip member, and a second bearing nip member. A workpiece is to be mounted on the base portion. The cutting portion supports a circular saw blade and is movable toward and away from the base portion. The gear case serves as an outer frame and has a bearing holder portion. The motor is adapted for driving the circular saw blade. The power transmission mechanism is disposed in the gear case for transmitting rotation of the motor to the circular saw blade. The power transmission mechanism includes a spindle having one end provided with a blade fixing section, and another end provided with a drive gear. The bearing is held by the bearing holder portion and is disposed between the blade fixing section and the drive gear for rotatably supporting the spindle to the gear case. The bearing holder is formed with a bearing holding hole having one open end facing the circular saw blade and another open end facing the drive gear. The bearing is set in the bearing holding hole. The first bearing nip member is disposed to cover at least a part of the one open end to hold one axial end of the bearing. The second bearing nip member is disposed to cover at least a part of the another open end to hold another axial end of the bearing.

In another aspect of the invention, there is provided a miter saw including a base portion and a cutting portion. A workpiece is to be mounted on the base portion. The cutting portion supports a circular saw blade and is movable toward and away from the base portion. The cutting portion includes a gear case having a bearing holder portion, a motor, a power transmission mechanism, and a bearing. The gear case serves as an outer frame. The motor is adapted for driving the circular saw blade. The power transmission mechanism is disposed in the gear case for transmitting rotation of the motor to the circular saw blade. The power transmission mechanism includes a spindle having one end provided with a blade fixing section, and another end provided with a drive gear. The bearing is held by the bearing holder portion and is disposed between the blade fixing section and the drive gear for rotatably supporting the spindle to the gear case. The bearing holder portion includes a bearing holder and a bearing nip member. The bearing holder is formed with a bearing holding hole having one open end facing the circular saw blade and another open end facing the drive gear. The bearing is set in the bearing holding hole. The bearing nip member is disposed to cover at least a part of the another open end to regulate a position of the bearing. The drive gear has one axial side facing the bearing holder. The one axial side is formed with a recess. The bearing nip member has a projecting section protruding toward the one axial side and concentric with the recess. A gap is defined between the recess and the projecting section.

In still another aspect of the invention, there is provided a miter saw including a base portion and a cutting portion. A workpiece is to be mounted on the base portion. The cutting portion supports a circular saw blade and is movable toward and away from the base portion. The cutting portion includes a gear case having a bearing holder portion, a motor, a power transmission mechanism, and a bearing. The gear case serves as an outer frame. The motor is adapted for driving the circular saw blade. The power transmission mechanism is disposed in the gear case for transmitting rotation of the motor to the circular saw blade. The power transmission mechanism includes a spindle having one end provided with a blade fixing section, and another end provided with a drive gear. The bearing is held by the bearing holder portion and is disposed between the blade fixing section and the drive gear for rotatably supporting the spindle to the gear case. The bearing has one axial end facing the blade fixing section and another axial end facing the drive gear. The bearing holder portion includes a bearing holder, and a bearing nip member. The bearing holder is formed with a bearing holding hole having one open end facing the circular saw blade and another open end facing the drive gear. The bearing is set in the bearing holding hole. The bearing holder has a radially inward annular projection at the another open end and protruding toward the drive gear to hold the another axial end of the bearing. The bearing nip member is disposed to cover at least a part of the one open end to hold one axial end of the bearing. The drive gear has one axial side facing the bearing holder and is formed with a recess. The radially inward annular projection is concentric with the recess defining a gap therebetween.

DETAILED DESCRIPTION OF THE PREFERRED EMBODIMENTS

Figure 1:
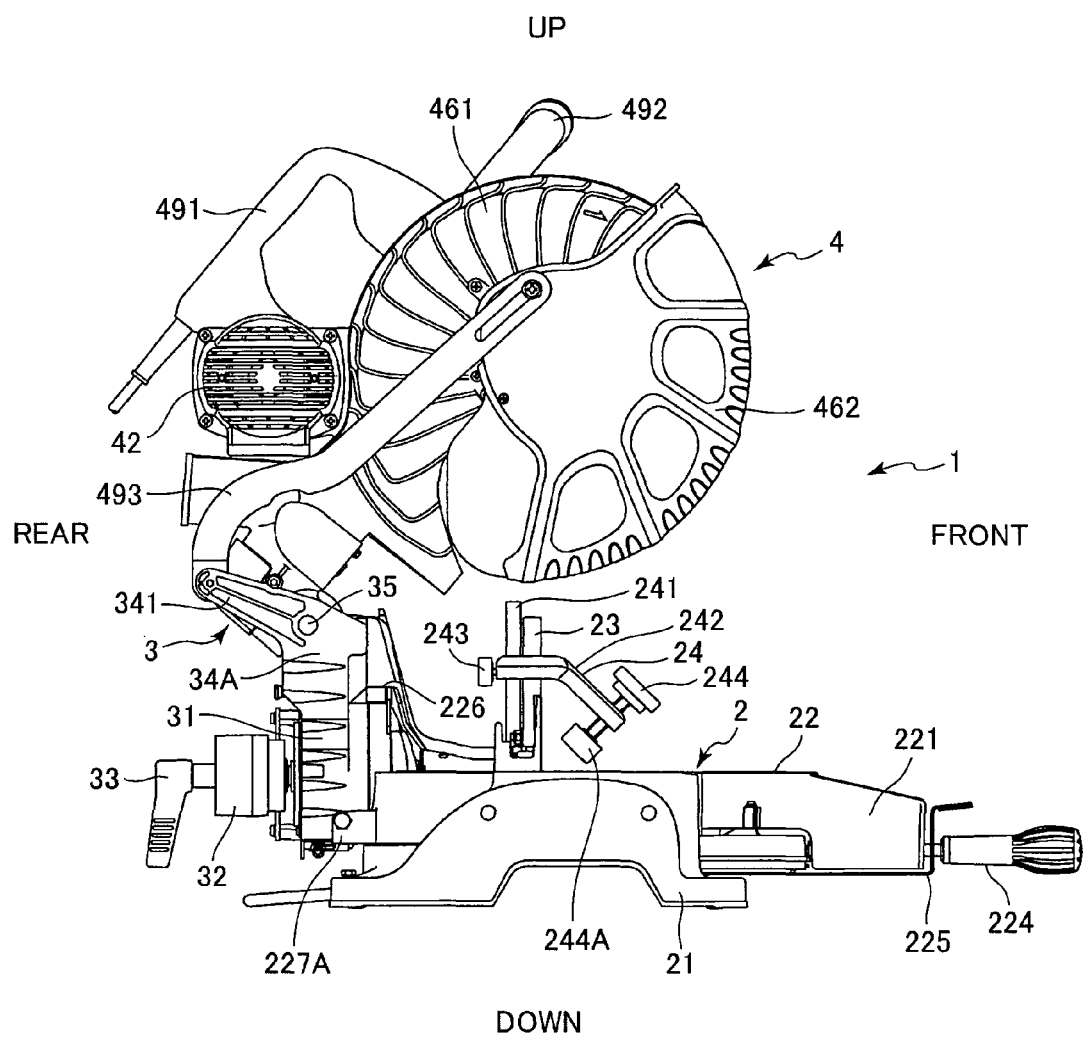
FIG. 1 is a side view of a miter saw according to a first embodiment of the present invention.
Figure 2:
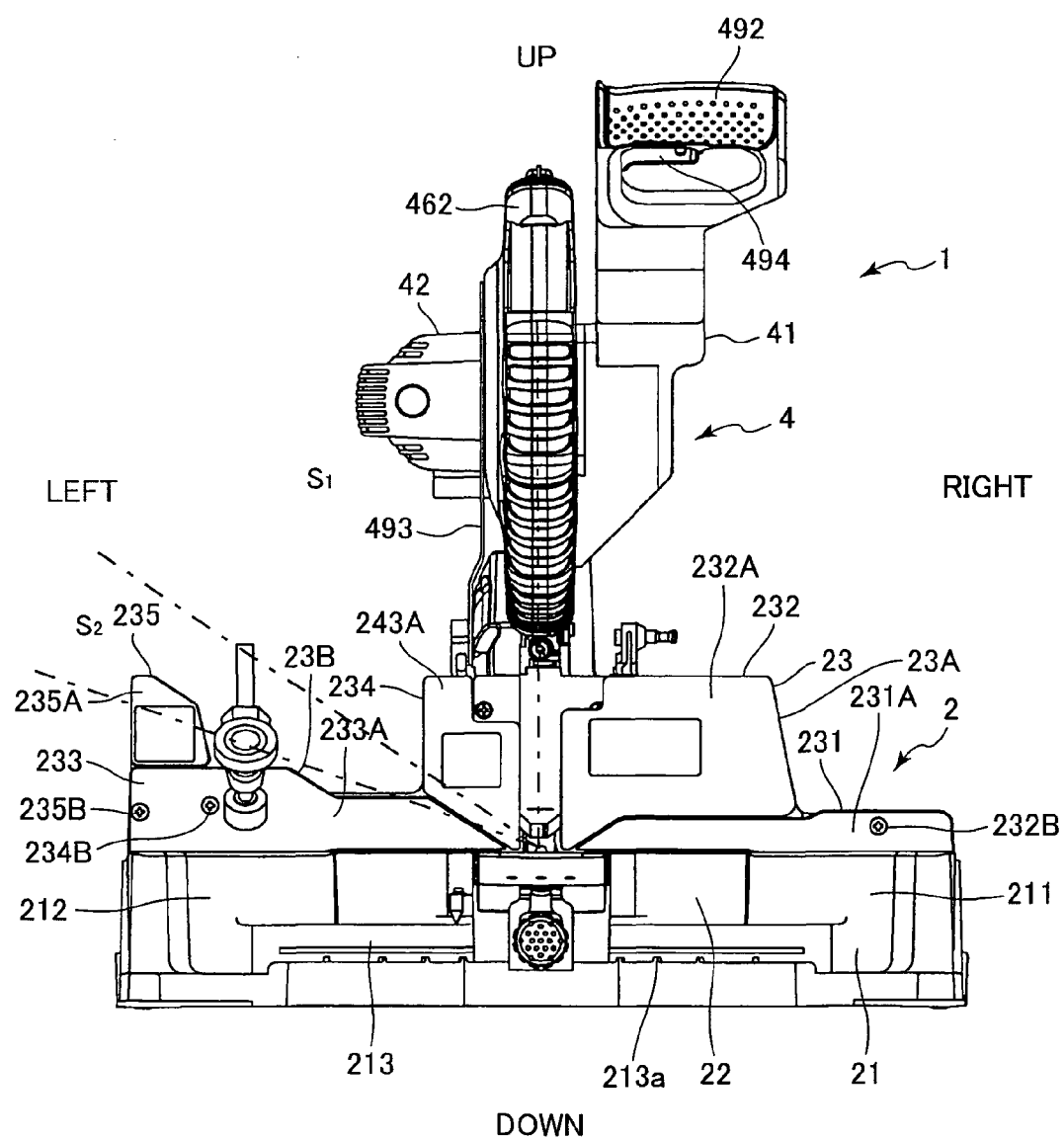
FIG. 2 is a front view of the miter saw according to the first embodiment.

A miter saw according to a first embodiment of the present invention will be described with reference to FIGS. 1 through 20. As shown in FIGS. 1 and 2, the miter saw 1 includes a base portion 2 installed on a floor or a table stand for mounting a workpiece such as a wood block, a cutting portion 4 for cutting the workpiece, and a support portion 3 for pivotally movably and laterally tiltably supporting the cutting portion to the base portion 2.

As shown in FIGS. 1 and 2, the base portion 2 includes a base 21, a turntable 22 rotatable about its axis relative to the base 21, and a fence 23 having a support surface to which a side surface of the workpiece is abuttable at a position above the base 21 for positioning the workpiece. In the following description, the supporting surface side of the fence 23 is defined as the front side, the extending direction of the fence 23 is defined as leftward/rightward or lateral direction, and a ground side of the base 21 is defined as a lower side.

Figure 3:
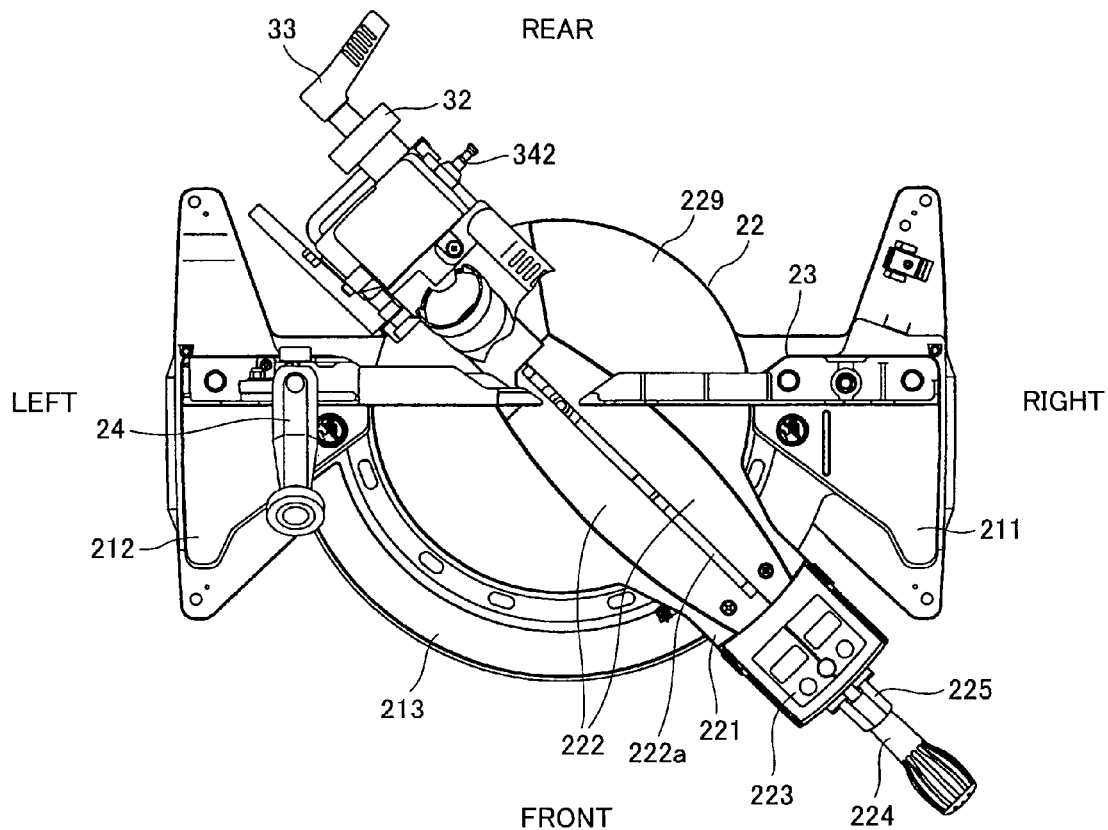
FIG. 3 is a plan view partially omitted according to the first embodiment.

As shown in FIGS. 2 and 3, the base 21 includes a right base 211 and a left base 212 interposing the turntable 22 therebetween. Each top surface of each base 211, 212 serves as a workpiece mounting surface. The base 21 also includes an arcuate portion 213 disposed between the right base 211 and the left base 212 and protruding frontwardly.

The arcuate portion 213 has a peripheral side whose radial center is coincident with a rotation axis of the turntable 22. As shown in FIG. 2, the peripheral side has a lower end formed with a plurality of locking grooves 213a engageable with a protruding portion of a lock lever 225 (FIG. 1). The plurality of locking grooves 213a are positioned at a predetermined angles such as 15 degrees, 30 degrees and 45 degrees relative to a reference axis (0 degrees) extending frontward from the rotation axis of the turntable 22 in a direction perpendicular to the fence 23.

Figure 13:
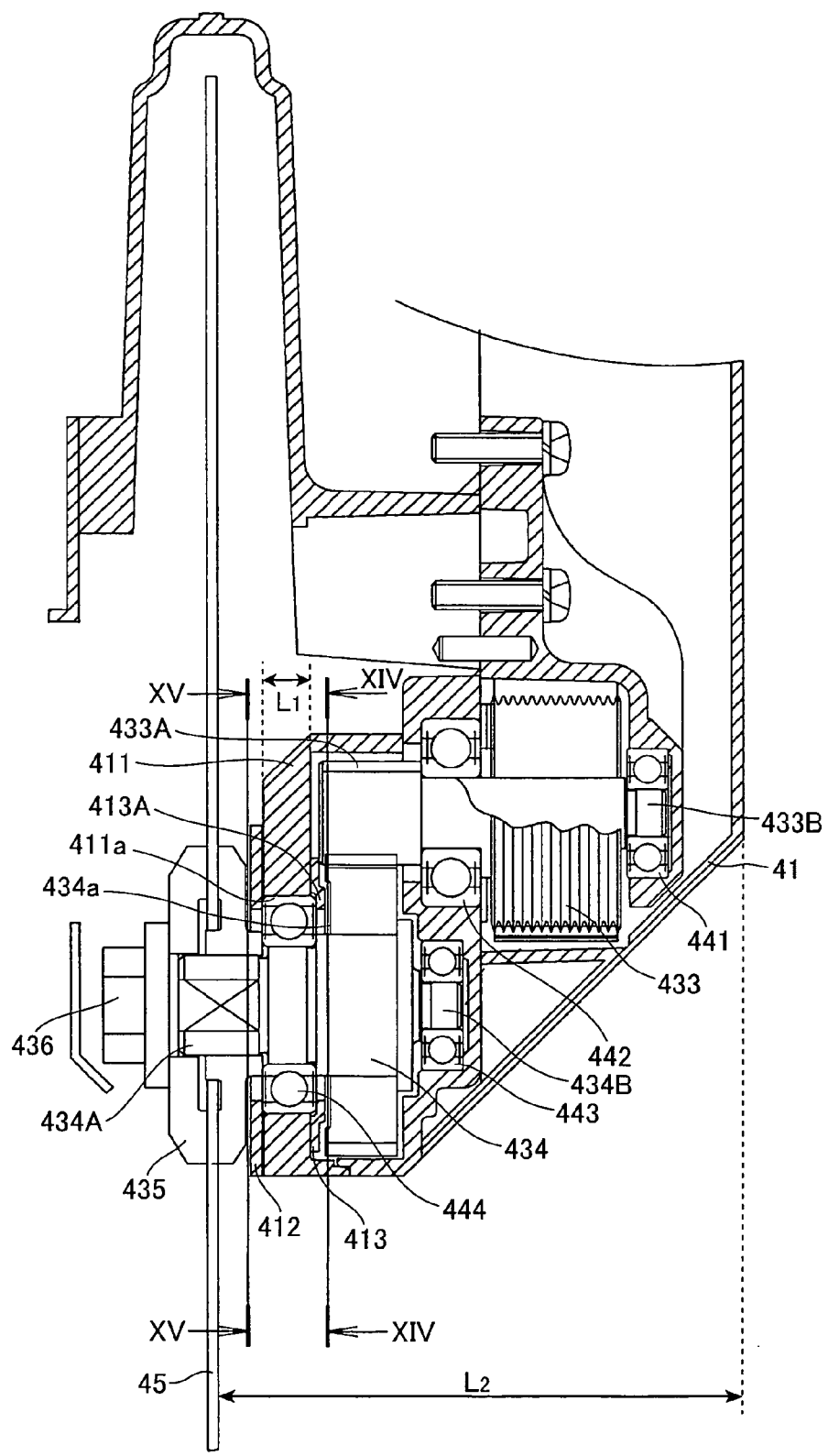
FIG. 13 is a cross-sectional view showing a power transmission mechanism in the cutting portion of the miter saw according to the first embodiment.
Figure 14:
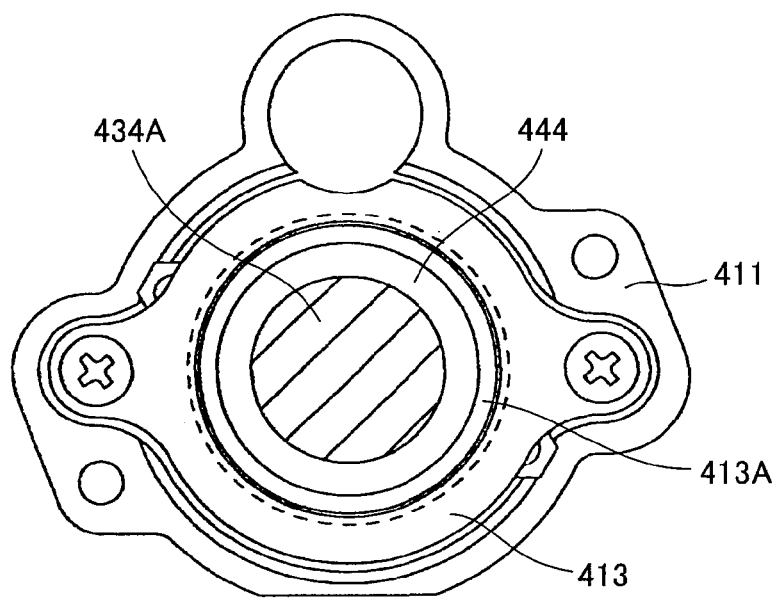
FIG. 14 is a cross-sectional view taken along the line XIV-XIV of FIG. 13.

As shown in FIG. 3, the turntable 22 includes a circular table section 229 interposed between the right and left bases 211 and 212, and having an upper surface on which a workpiece is mounted. The circular table section 229 defines therein a rotation axis of the turntable 22. The turntable 22 also includes a neck table section 221 extending frontward from the circular table section 229 and positioned above the arcuate portion 213. The upper surfaces of the circular table section 229 and the neck table section 221 are flush with the upper surface of the base 21. A semicircular recess is formed at the turntable 22. The semicircular recess is open at the upper surfaces of the circular table section 229 and the neck table section 221 in a fusiform-shaped configuration, and has a semi-circular contour in the vertical direction in conformance with the contour of the circular saw blade 45 (FIG. 13). As shown in FIG. 3, the upper opening is covered with a fusiform-shaped slit plate 222 having a center portion formed with a slit 222a which allows the circular saw blade 45 to pass therethrough when the cutting portion 4 is pivotally moved toward the turntable 22.

A fixing handle 224 is provided at a front side of the neck table section 221. The fixing handle 224 serves as a grip for rotating the turntable 22 and for fixing a pre-determined angular position of the turntable 22. As shown in FIGS. 1 and 3, the lock lever 225 is fixed to the turntable 22 at a position below the fixing handle 224 and below the arcuate portion 213. The lock lever 225 extends to the front end position of the neck table section 221, and is bent upward along the front end face of the neck table section 221. The lock lever 225 has a protruding portion protruding upwardly at a position in confrontation with the arcuate portion 213. The protruding portion is engageable with each one of the locking grooves 213a (FIG. 2) formed in the arcuate portion 213. The turntable 22 is fixed to the base 21 at a predetermined rotation angle defined by the locking grooves 213 upon engagement of the protruding portion of the lock lever 225 with one of the locking grooves 213a.

As shown in FIG. 3, an angle display portion 223 is provided at the front upper end portion of the neck table section 221. The angle display portion 223 displays a miter angle (rotation angle of the turntable 22 relative to the base 21) at every 0.2 degrees and bevel angle (laterally tilting angle of the cutting portion 4 relative to the base 21) at every 0.5 degrees upon detection by a miter sensor (not shown) and a bevel sensor (not shown).

The fence 23 includes a right fence 23A and a left fence 23B interposing the slit 222a therebetween. The right fence 23A includes a fixed right fence 231 fixed to the right base 211, and a right subordinate fence 232 movably connected to the fixed right fence 231. The fixed right fence 231 has a fixed right support surface 231A protruding perpendicular to the upper surface of the right base 211. The right subordinate fence 232 has a right subordinate support surface 232A positionable in flush with the fixed right support surface 231A when the right subordinate fence 232 is moved to a position above the fixed right fence 231 and in the vicinity of the slit 222a. A right pivot shaft 232B extends at a right end portion of the fixed right fence 231 in a direction perpendicular to the fixed right support surface 231A. Thus, the right subordinate fence 232 is pivotally movably connected to the fixed right fence 231 through the right pivot shaft 232B. The fixed right support surface 231A and the right subordinate support surface 232A are flush with each other at any pivotal posture of the right subordinate fence 232.

The left fence 23B includes a fixed left fence 233 fixed to the left base 212, and first and second left subordinate fences 234 and 235 those connected to the fixed left fence 233. Incidentally, a first tilting region S1 (FIG. 2) is defined as a specific region where the cutting portion 4 does not contact the second left subordinate fence 235 but contacts the first left subordinate fence 234 when the cutting portion 4 is tilted leftward. Further, a second tilting region S2 (FIG. 2) is defined as a specific region where the cutting portion 4 contacts the second left subordinate fence 235 when the cutting portion 4 is tilted leftward.

Figure 5:
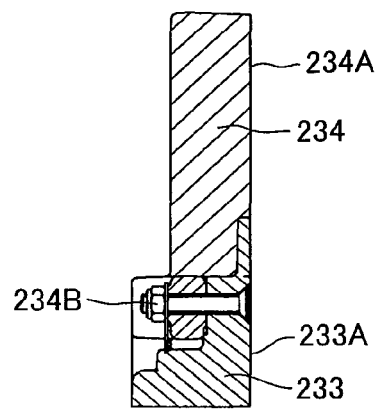
FIG. 5 is a cross-sectional view taken along the line V-V of FIG. 4.

The fixed left fence 233 has a fixed left support surface 233A protruding perpendicular to the upper surface of the left base 212. The fixed left fence 233 is in flush with the fixed right support surface 231A. As shown in FIGS. 1 and 5, the first left subordinate fence 234 has a first left subordinate support surface 234A positionable in flush with the fixed left support surface 233A when the first left subordinate fence 234 is moved to a position above the fixed left fence 233 and in the vicinity of the slit 222a.

Figure 4:
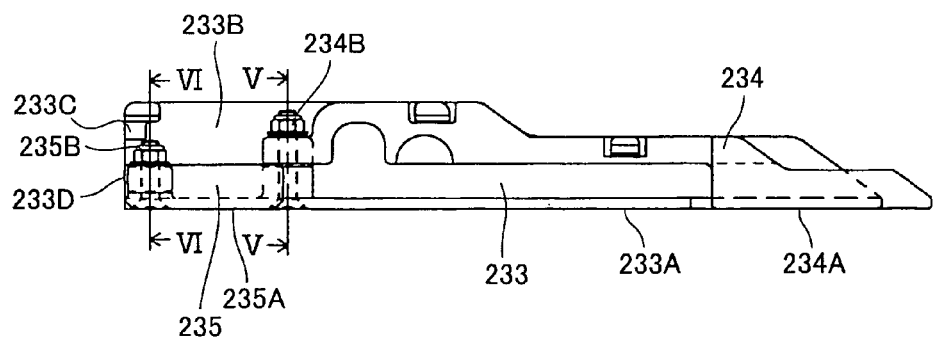
FIG. 4 is a plan view showing a left fence of the miter saw according to the first embodiment.
Figure 6:
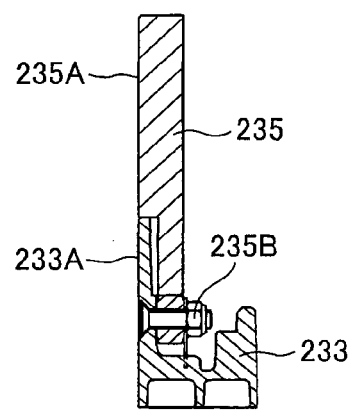
FIG. 6 is a is a cross-sectional view taken along the line VI-VI of FIG. 4.

As shown in FIGS. 1 and 6, the second left subordinate fence 235 has a second left subordinate support surface 235A. The second left subordinate support surface 235A is in flush with the fixed left support surface 233A when the second left subordinate fence 235 is moved to a position above the fixed left fence 233 and at a left end thereof. As shown in FIG. 4, a first pivot shaft 234B extends at a left end portion of the fixed left fence 233 in a direction perpendicular to the fixed left support surface 233A. Further, a second pivot shaft 235B extends at a leftmost end of the fixed left fence 233 in the same direction.

Figure 7:
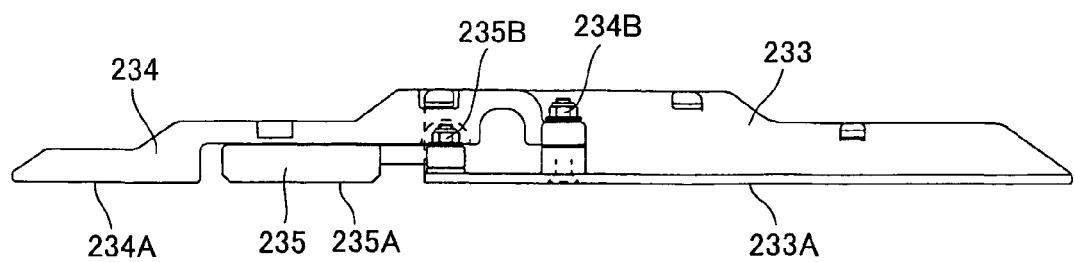
FIG. 7 is a plan view showing a fully pivotally moving state of the left fence of the miter saw according to the first embodiment.

Thus, the first left subordinate fence 234 is pivotally movably connected to the fixed left fence 233 through the first pivot shaft 234B, and the second left subordinate fence 235 is pivotally movably connected to the fixed left fence 233 through the second pivot shaft 235B. As shown in FIG. 7, the fixed left support surface 233A and the first and second left subordinate support surfaces 234A and 235A are flush with one other at any pivotal posture of the first and second left subordinate fences 234 and 235.

As show in FIG. 4, a first stop 233C and a second stop 233D are provided to the fixed left fence 233 for regulating pivotal movement of the first left subordinate fence 234 and second left subordinate fence 235, respectively. The first and second stops 233C, 233C are located at the left end and a rear side of the fixed left fence 233. That is, the first left subordinate fence 234 and the second left subordinate fence 235 are abuttable on the first stop 233C and the second stop 233D, respectively, when the first and second left subordinate fences 234, 235 are pivotally moved from the position above the fixed left fence 233, thereby avoiding excessive pivotal movement of the subordinate fences 234,235. When the first left subordinate fence 234 is in abutment with the first stop 233C, the first left subordinate surface 234A is located outside of the first and second tilting regions S1 and S2 and is aligned with the fixed left support surface 233A at a position remote from the circular saw blade 45. Similarly, when the second left subordinate fence 235 is in abutment with the second stop 233D, the second left subordinate surface 235A is located outside of the first and second tilting regions S1 and S2 and is aligned with the fixed left support surface 233A at a position remote from the circular saw blade 45.

Further, a locus of the first left subordinate fence 234 is offset from a locus of the second left subordinate fence 235. Thus, the first and second left subordinate fences 234,235 can be moved independently of each other.

As shown in FIGS. 1 and 2, a vise unit 24 is provided at the upper surface of the left base 212 and near the left fence 23B for pressing the worpiece toward the upper surface of the base portion 2 and toward the support surface of the fence 23 to hold the workpiece. The vise unit 24 includes a vise shaft 241, a holder 242 and a vise 244. The vise shaft 241 extends vertically from the upper surface of the left base 212 at a position behind the left fence 23B. The holder 242 has one end releasably fixed to the vise shaft 241 by a screw 243, and has another end with which the vise 244 is threadingly engaged. The holder 242 can be detached from the vise shaft 241 by unfastening the screw 243. The holder 242 has a rear portion positioned immediately above the left fence 23B, and has a front portion positioned frontward of the support surface of the left fence 23B. The front portion of the holder 242 is bent downwardly. The vise 244 is attached to the downwardly slant portion of the holder 242 in a direction perpendicular thereto. The vise 244 has a vise plate 244A at its lower end facing the base portion 2. The vise plate 244A is movable toward and away from the surface of the base portion 2 because of the threading engagement, with maintaining inclined posture with respect to the surface of the base portion 2.

Figure 9:
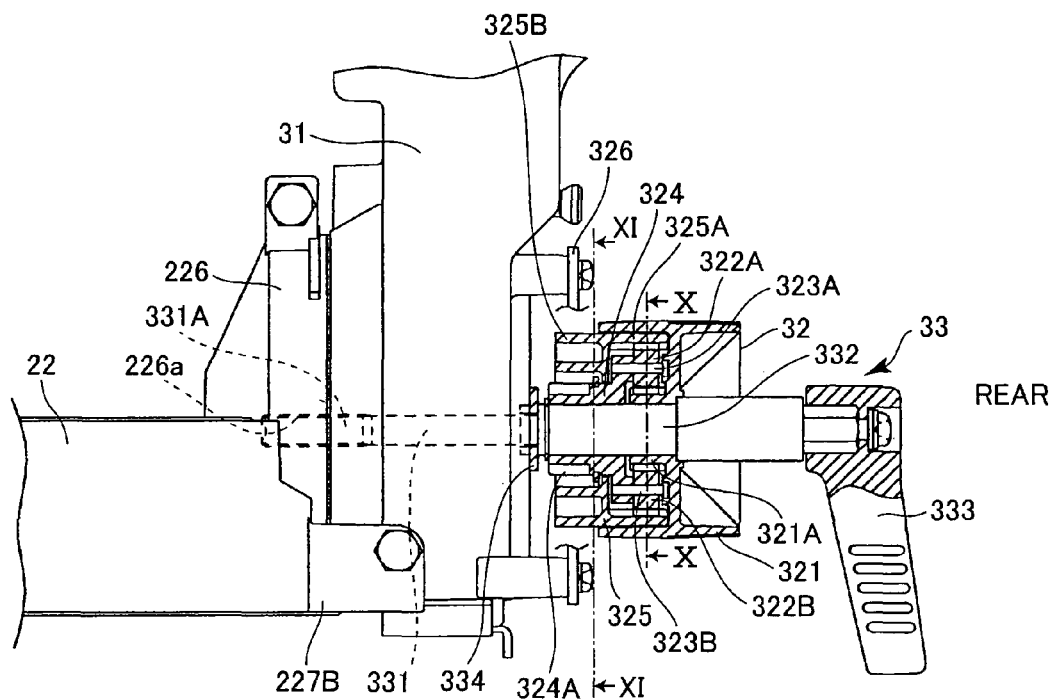
FIG. 9 is an enlarged side cross-sectional view showing the support portion of the miter saw according to the first embodiment.

As shown in FIG. 9, a tilt support 226 for supporting the support portion 3 is provided at a rear side of the turntable 22 and at a position opposite to the neck table section 221 with respect to the circular table section 229. The tilt support 226 is formed with a thread hole 226a threadingly engageable with a male screw 331A formed at a tip end portion of a clamp shaft 331 (described later). The thread hole 226a is open at a surface in contact with a tilt portion 31 described later.

Figure 8:
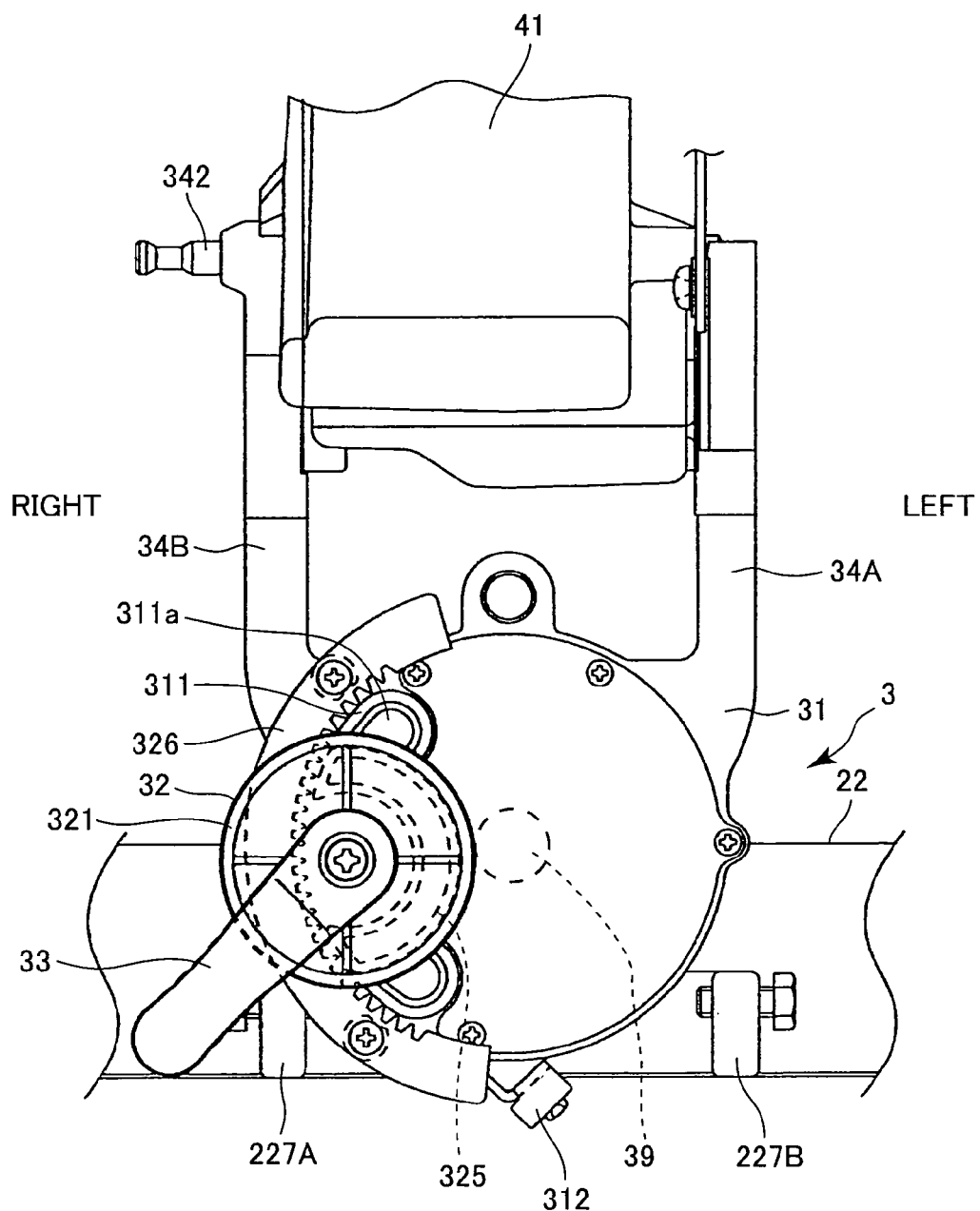
FIG. 8 is a rear view showing a support portion in the miter saw according to the first embodiment.

As shown in FIG. 8, tilt stops 227A, 227B are provided at a rear side surface of the turntable 22 and at right side and left side of the tilt support 226 (FIG. 9). The tilt portion 31 has an abutment member 312 selectively abuttable on one of the tilt stops 227A and 227B. Thus, maximum tilting angle of the cutting portion 4 can be regulated by the abutment.

As shown in FIGS. 1 and 8, the support portion 3 mainly includes the tilt portion 31 provided with a deceleration mechanism 32 and a clamp portion 33. In FIG. 8, the tilt portion 31 is laterally tiltably supported to the tilt support 226 through a tilt shaft 39. That is, the tilt portion 31 is tiltable about an axis of the tilt shaft 39. The tilt shaft 39 has an axis coincident with an extending direction of the slit 222a. The tilt portion 31 has a slot defining region 311 in which an arcuate slot 311a is formed. A contour of the arcuate slot 311a is defined by an imaginary circle whose center is coincident with the axis of the tilt shaft 39. The arcuate slot 311a allows the clamp shaft 331 to extend therethrough in the axial direction of the tilt shaft 39. Further, the arcuate slot 311a is positioned to superpose with the thread hole 226a of the tilt support 226 regardless of the pivotal movement of the tilt portion 31.

The tilt portion 31 has a pair of support arms 34A, 34B at a position above the tilt shaft 39 for supporting the cutting portion 4. A pivot pin 35 (FIG. 1) is bridged between the pair of support arms 34A and 35B and extends in a direction perpendicular to the axial direction of the tilt shaft 39 for pivotally movably supporting the cutting portion 4 to the support portion 3. That is, the cutting portion 4 is pivotally movable about the pivot pin 35 toward and away from the base portion 2. An arm support 341 (FIG. 1) is provided at the left support arm 34A to which one end of an arm 493 (described later) is pivotally movably connected. Further, the right support arm 34B is attached with a knob 342 that temporarily permits the cutting portion 4 immovable. Moreover, an arcuate inner gear teeth segment 326 is fixed to the tilt support 39 in the vicinity of the slot defining region 311. The arcuate inner gear teeth segment 326 has a curvature which is a part of an imaginary circle whose center is coincident with the axis of the tilt shaft 39 and positioned radially outwardly of the arcuate slot 311a with respect to the axis of the tilt shaft 39.

As shown in FIG. 9, the clamp portion 33 has the clamp shaft 331, a pressing section 332 and a clamp lever 333. The clamp shaft 331 is formed with the male screw 331A at its tip end portion. The pressing section 332 is coaxial with the clamp shaft 331 and has a diameter greater than the clamp shaft 331 to provide a stepped portion. The clamp lever 333 is connected to the rear end of the pressing section 332. The clamp shaft 331 extends through the arcuate slot 311a and is threadingly engaged with the thread hole 226a. Thus, the tilting amount of the tilt portion 31 with respect to the tilt support 226 is dependent on the relative moving amount between the clamp shaft 331 and the arcuate slot 311a. The diameter of the pressing section 332 is greater than a width of the arcuate slot 311a. Thus, upon axial advancing movement of the clamp shaft 331 due to the treading advancing engagement with the thread hole 226a by the manipulation to the clamp lever 333, the end of the pressing section 332 (stepped portion at the boundary between the clamp shaft 331 and the pressing section 332) will urge the slot defining region 311. Consequently, the tilt support 226 is brought into intimate contact with the tilt portion 31 to generate friction force therebetween.

Since the cutting portion 4 is positioned above the tilt shaft 39, the tilt portion 31 is urged to be pivotally moved leftward or rightward due to the weight of the cutting portion 4 if the tilt portion 31 is not fastened to the tilt support 226. On the other hand, by rotating the clamp lever 333 to axially move the clamp shaft 331 into the thread hole 226a, the urging force of the pressing section 332 to the slot defining region 311 is increased to increase friction between the tilt portion 31 and the tilt support 226, thereby restraining tilting motion of the tilt portion 31. This state will be referred to as "a provisional fixing state" where the tilt portion 31 is not movable because of its own weight and a weight of the cutting portion 4 but is movable with respect to the tilt support 226 if external force is applied to the cutting portion 4 or to the tilt portion 31.

If the clamp shaft 331 is further advanced, the urging force of the pressing section 332 is further increased, so that the friction between the tilt portion 31 and tilt support 226 is further increased. Consequently, the tilt portion 31 is forcibly pressed against the tilt support to provide integration therebetween. This state will be referred to as "full fixing state" where the tilt portion 31 is fully fixed and immovable with respect to the tilt support 226 despite of the application of external force.

As shown in FIGS. 8 and 9, near the clamp portion 33, a bevel angle fine control arrangement is provided. The fine control arrangement includes the deceleration mechanism 32, i.e., a planetary gear mechanism and an adjustment knob 321. Rotational centers of the planetary gear mechanism 32 and adjustment knob 321 are coincident with the axis of the clamp shaft 331. The planetary gear mechanism 32 includes a sun gear 321A, a pair of planetary gears 322A, 322B, a ring gear 325, pins 323A, 323B, a planetary gear support 324 and an output gear 324A.

Figure 11:
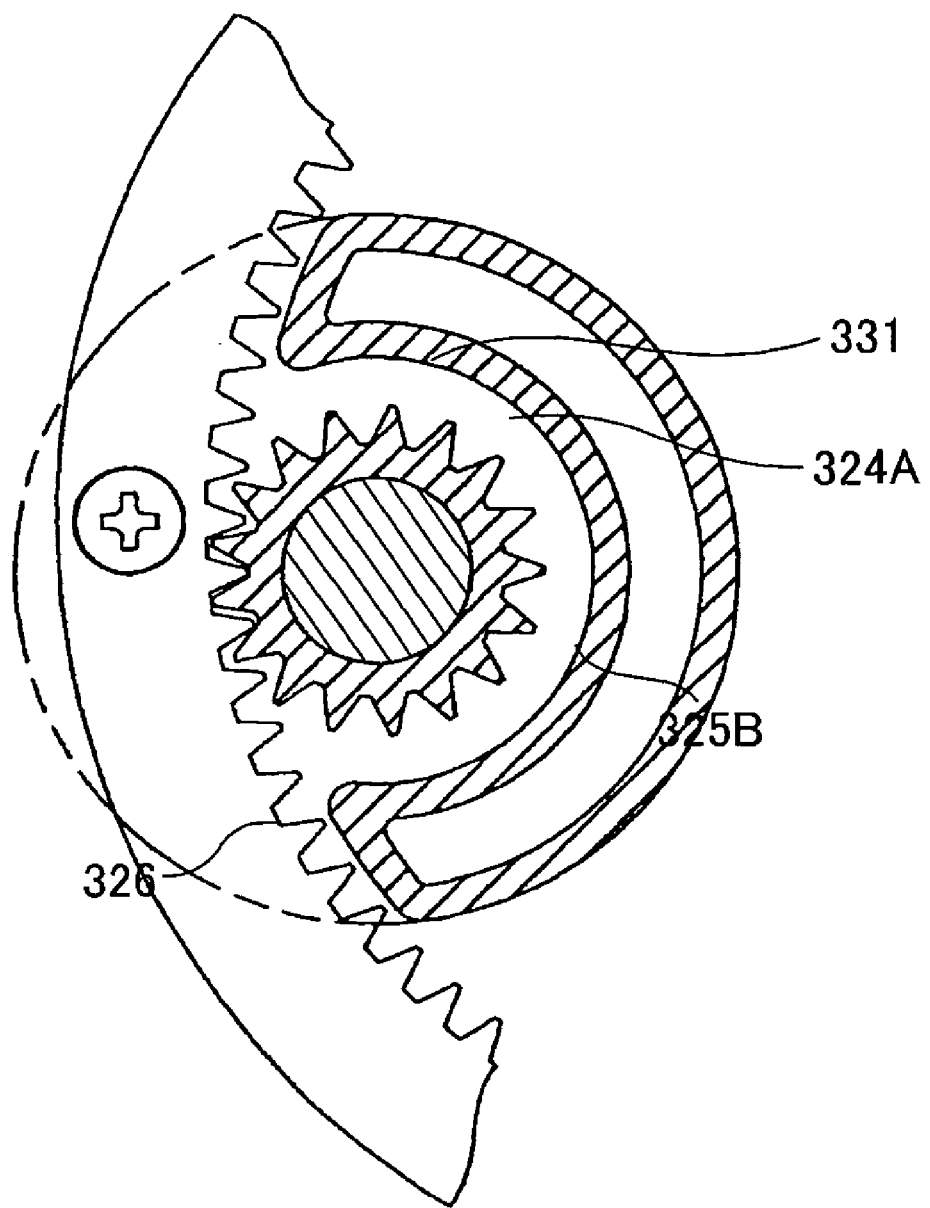
FIG. 11 is a cross-sectional view taken along the line XI-XI of FIG. 9.

The sun gear 321A is provided integrally with the adjustment knob 321 and is rotatable about the clamp shaft 331. The pair of planetary gears 322A, 322B are arranged symmetrically with each other with respect to the sun gear 321A, and are meshedly engaged with the sun gear 321A. The ring gear 325 has a rear part provided with a inner gear teeth portion 325A meshedly engaged with the planetary gears 322A, 322B and a front part 325B surrounding the output gear 324A. As shown in FIG. 11, the front part 325B has a semi-circular shape in cross-section and is abuttable on the fixed arcuate inner gear teeth 326. Because of the abutment of the front axial part 325B on the arcuate inner gear teeth 326, rotation of the ring gear 325 is prevented. With this abutment arrangement, it is unnecessary to fix the ring gear 325 to a stationary component.

The planetary gear support 324 is rotatable about the clamp shaft 331. The pins 323A, 323B extend from the planetary gear supports 324 for rotatably supporting the pair of planetary gears 322A, 322B, respectively. The output gear 324A is coaxial with and integral with the planetary gear support 324. The output gear 324A is meshedly engaged with the arcuate inner gear teeth 326 (FIG. 11).

Since the front part 325B has arcuate shape, and the output gear 324A is meshedly engaged with the arcuate inner gear teeth 326, an imaginary arcuate extension line from the front part 325B is substantially superposed with the arcuate inner gear teeth 326 (FIG. 11). Even if the rear part of the ring gear 325 is urged to be rotated, the rotation of the rear part is prevented by the abutment of the front part 325B against the arcuate inner gear teeth 326.

Figure 10:
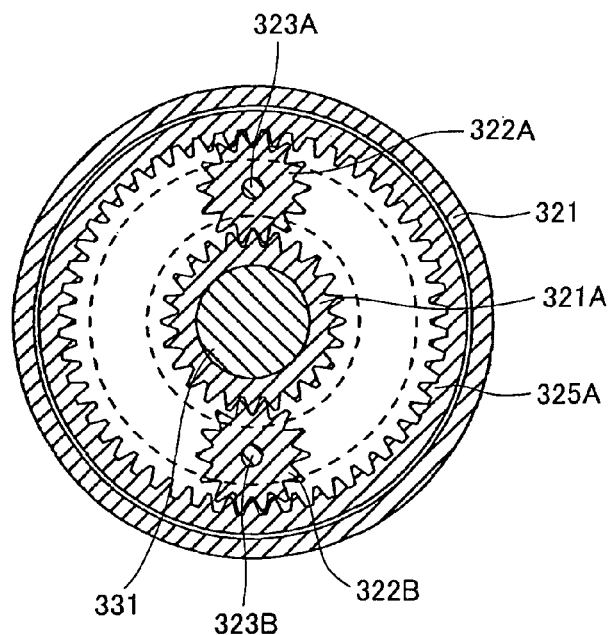
FIG. 10 is a cross-sectional view taken along the line X-X of FIG. 9.

Upon rotation of the sun gear 321A by the rotation of the adjustment knob 321 in FIGS. 9 and 10, the pair of planetary gears 322A, 322B are rotated about pins 323A, 323B, respectively. Thus, the ring gear 325 is urged to be rotated. However, since the rotation of the ring gear 325 about the clamp shaft 331 is prevented (FIG. 11), rotation of the ring gear 325 against the planetary gears 322A, 322B is prevented, and instead, the pair of planetary gears 322A, 32B are orbitally moved about the sun gear 321A.

Since the planetary gear support 324 supports the planetary gears 322A, 322B through the pins 323A, 323B, the planetary gear support 324 is also rotated about the clamp shaft 331 in accordance with the orbital motion of the planetary gears 322A, 322B. Thus, the output gear 324A integral with the planetary gear support 324 is also rotated about the clamp shaft 331.

Since the output gear 324A is in meshing engagement with the arcuate inner gear teeth 326, relative rotation occurs between the output gear 324A and the arcuate inner gear teeth 326. Since the planetary gear mechanism 32 including the output gear 324A is supported by the tilt support 226 through the clamp shaft 331 and the arcuate inner gear teeth 326 is fixed to the tilt portion 31, the relative rotation between the output gear 324A and the arcuate inner gear teeth 326 causes the pivotal movement of the tilt portion 31 with respect to the tilt support 226. In summary, the rotation of the adjustment knob 321 causes tilting motion of the tilt portion 31 with respect to the tilt support 226. Since high deceleration rate between the sun gear 321A and the output gear 324A is provided, rotation of the adjustment knob 321 will provide excessively small tilting amount of the tilt portion 31 with respect to the tilt support 226. Consequently, fine tilting (bevel) control is achievable by the manipulation of the adjustment knob 321 after the cutting portion 4 is tilted to a position near an intended tilting position. After the fine tilting control is completed, the clamp portion 33 is manipulated to fix the intended tilting position. The employment of the planetary gear mechanism can provide a compact deceleration device.

Since concentric relationship is provided between the clamp portion 33 and planetary gear mechanism, an axis of the clamp shaft 331 can serve as an axis of the planetary gear mechanism, thereby reducing a size. Further, since the pressing section 332 of the clamp portion 33 presses the slot defining region 311 defining the arcuate slot 311a through which the clamp shaft 331 extends to provide integrity between the tilt portion 31 and tilt support 226, the pressing degree can be adjusted by the clamp lever 333 so as to selectively obtain the full fixing state where the tilt portion 31 is fully fixed and immovable with respect to the tilt support 226 and the provisional fixing state where the tilt portion 31 is not movable because of its own weight but is movable with respect to the tilt support 226 if external force is applied to the cutting portion 4 or to the tilt portion 31.

Figure 12:
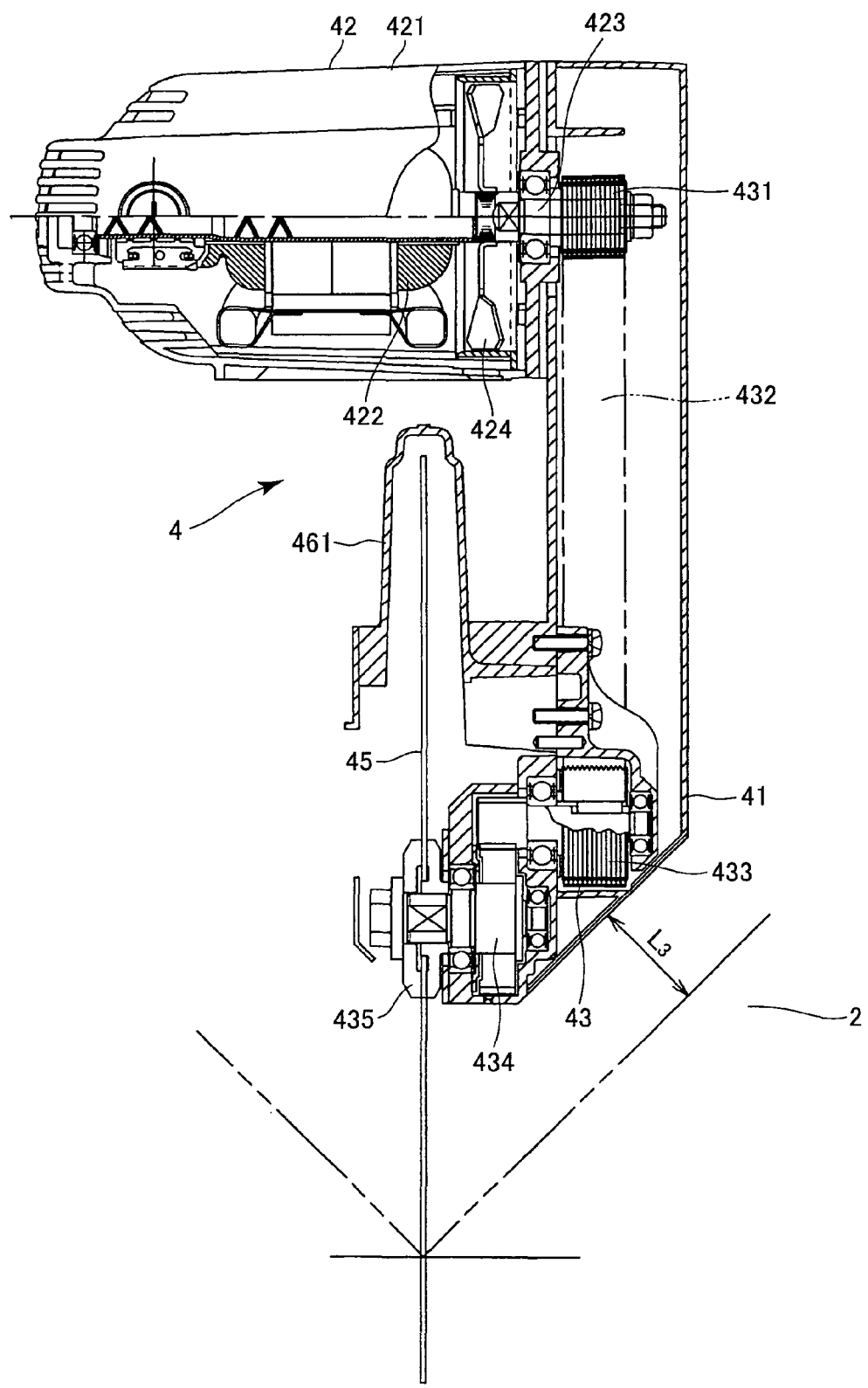
FIG. 12 is a front-view partly cross-sectioned showing a cutting portion of the miter saw according to the first embodiment.

As shown in FIGS. 12 and 13, the cutting portion 4 includes a gear case 41, a motor portion 42, a power transmission mechanism 43, and the circular saw blade 45. The gear case 41 is a die-casting product made from an aluminum or aluminum alloy. The gear case 41 accommodates therein the power transmission mechanism 43 and serving as an outer frame of the cutting portion 4. The gear case 41 has a lower portion pivotally movably connected to the pair of support arms 34A, 34B (FIG. 8). A bearing holder 411 formed with a securing hole 411a is fixed to the gear case 41 at a position close to the circular saw blade 45.

The motor portion 42 includes a motor case 421 connected to the gear case 41, a motor 422 serving as a power source accommodated in the motor case 421, a drive shaft 423 extending into the gear case 41, a cooling fan 424 coupled to the drive shaft 423 and disposed in the motor case 421.

As shown in FIGS. 12 and 13, the power transmission mechanism 43 includes a first pulley 431, a second pulley 433, an endless belt 432, a first gear 433A and a second gear 434. The first pulley 431 is mounted on the drive shaft 423 at a position within the gear case 41.

The endless belt 432 is mounted between the first pulley 431 and second pulley 433 for transmitting rotation of the first pulley 431 to the second pulley 433. In FIG. 13, the first gear 433A is a spur gear disposed at one axial side of and concentrically with the second pulley 433. The second gear 434 is a spur gear meshingly engaged with the first gear 433A. A spindle 434A is rotatably supported to the gear case 41 and concentrically couples the second gear 434. One end of the spindle 434A extends out of the gear case 41 for securing the circular saw blade 45.

A second pulley shaft 433B extends concentrically with the second pulley 433 in a direction opposite to the first gear 433A, and the second pulley shaft 433B is rotatably supported to the gear case 41 through a first bearing 441. A second bearing 442 is held by the gear case 41 and positioned between the second pulley 433 and the first gear 433A for rotatably supporting the second pulley 433 and the first gear 433A within the gear case 41.

The second gear 434 has one axial side formed with a circular recess 434a whose inner diameter is slightly greater than an outer diameter of an outer race of a fourth bearing 444 (described later). The second gear 434 has another axial side from which a second gear shaft 434B coaxial with the spindle 434A extends. A third bearing 443 is assembled to the gear case 41 for rotatably supporting the second gear shaft 434B. The fourth bearing 444 is positioned between the second gear 434 and the spindle 434A and is fitted in the securing hole 411a of the bearing holder 411, so that the fourth bearing 444 is held by the gear case 41.

The bearing holder 411 has a thickness L1 smaller than an axial length of the fourth bearing 444, so that only the bearing holder 411 cannot sufficiently hold the fourth bearing 444. To avoid this, a first bearing nip member 412 is provided at one axial side of the bearing holder 411 (one axial side being the circular saw blade 45 side), and a second bearing nip member 413 is provided at another axial side of the bearing holder 411 (the other axial side being the second gear 434 side) in order to nip the outer race of the fourth bearing 444.

Figure 15:
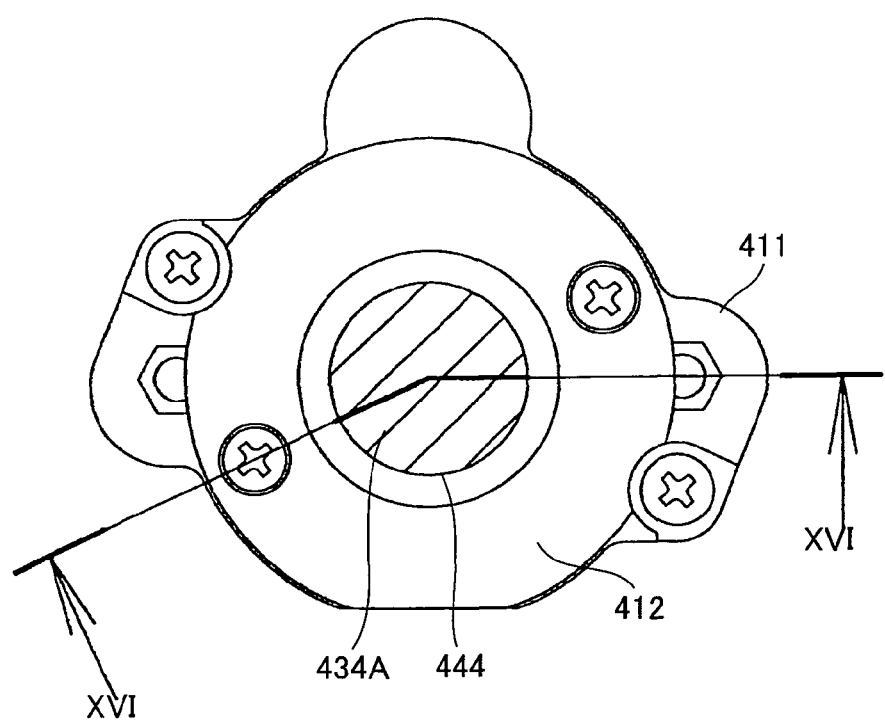
FIG. 15 is a cross-sectional view taken along the line XV-XV of FIG. 13.

The first and second bearing nip members 412, 413 are produced by punching a thin steel plate. Steel provides a mechanical strength higher than that of the material of the gear case 41. The first bearing nip member 412 is a flat plate and is fixed to the bearing holder 411 by screws as shown in FIGS. 15 and 16.

Figure 16:
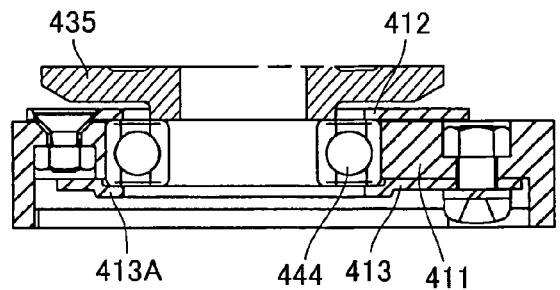
FIG. 16 is a cross-sectional view taken along the line XVI-XVI of FIG. 15.

The second bearing nip member 413 is produced by drawing a metal plate to form an annular stepped portion configured to set the outer race of the fourth bearing 444 within the annular stepped portion as shown in FIG. 16. The second bearing nip member 413 is fixed to the bearing holder 411 at a position in confrontation with the side face of the second gear 434. The stepped portion provides a protrusion 413A protruding toward the second gear 434.

The circular recess 434a having the inner diameter slightly greater than the outer diameter of the fourth bearing 444 is formed in the second gear 434 at a position in confrontation with and concentrically with the protrusion 413A. The protrusion 413A is positioned within the circular recess 434a. Since a clearance is defined between the second gear 434 and the protrusion 413A, the rotation of the second gear 434 is not disturbed by the protrusion 413A. Because of this arrangement, a width of the gear case 411 in the axial direction of the second gear 434 can be reduced. This width can further be reduced, by a design such that the protrusion 413A is positioned as much as possible into the circular recess 434a.

The circular saw blade 45 is fixed to the spindle 434A by a washer 435 and a bolt 436. Since the thickness of the bearing holder 411 is smaller than the axial length of the fourth bearing 444, a distance between the circular saw blade 45 and the second gear 434 can be reduced, thereby reducing a distance between the circular saw blade 45 and the power transmission mechanism 43. Accordingly, a distance L2 between the circular saw blade 45 and an outer side surface of the gear case 41 can be reduced to thus provide a compact gear case 41. This arrangement allows the side surface of the circular saw blade 45 to be positioned closer to the workpiece, or a thicker workpiece can be subjected to bevel cutting when the cutting portion 4 is tilted to the gear case 41 side. Further, by the employment of the first and second bearing nip members 412, 413 those being separating components from the bearing holder 411, a thickness of the bearing holder in the axial direction of the fourth bearing 444 can be reduced. Moreover, because of the nip-holding the fourth bearing 444 between the first and second bearing nip members 412 and 413, assembly of the fourth bearing 444 to the bearing holder 411 can be facilitated.

As shown in FIG. 1, a saw cover 461 connected to or integral with the gear case 41 is disposed around a half of the circular saw blade 45, and a safety cover 462 is pivotally movably supported to the saw cover 461 for covering a remaining half of the circular saw blade 45 when the cutting portion 4 is at its upper position (FIG. 1). Moving direction of the safety cover 462 is the circumferential direction of the circular saw blade 45.

Another end of the arm 493 is attached to the safety cover 462. By pivotally moving the cutting portion 4 about the pivot pin 35 toward the base portion 2, the safety cover 462 is pivotally moved in a clockwise direction in FIG. 1 to provide a raised position (FIG. 20) thereby exposing the circular saw blade 45 to the workpiece.

As shown in FIG. 1, the gear case 41 has a carriage handle 491 at a position above the motor portion 42 for hand carrying the entire miter saw 1. Further, a cutting handle 492 is provided to the gear case 41 at a position above and frontward of the carriage handle 491 (FIG. 2) for cutting the workpiece. The cutting handle 492 has a trigger 494. Upon pulling the trigger 494, electric current is applied to the motor portion 42 for driving the circular saw blade 45.

Figure 18:
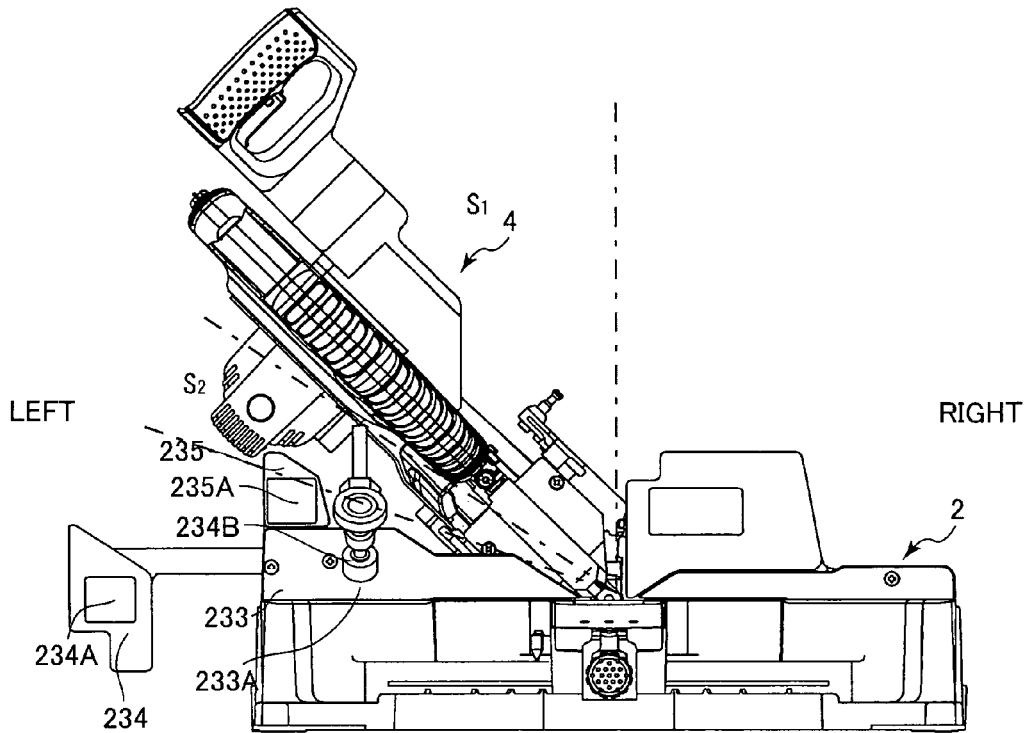
FIG. 18 is a front view showing another bevel cutting state in which the cutting portion is tilted leftward in the miter saw according to the first embodiment.

As shown in FIG. 2, the first left subordinate fence 234 is positioned within the first tilting region S1 when the first left subordinate fence 234 is positioned above the fixed left fence 233. In this case, since the first left subordinate fence 234 is located nearby the circular saw blade 45, only the vertical pivotal movement of the cutting portion 4 relative to the upper surface of the base portion 2 is achievable. Further, in this case, the left fence 23B has an increased height to suitably support the workpiece. If the cutting portion 4 is to be tilted leftward to be positioned within the first tilting region S1, the first left subordinate fence 234 is provisionally pivotally moved to the position outside of the first tilting region S1 as shown in FIG. 18. Thus, the cutting portion 4 can be freely tilted within the first tilting region S1, and cutting can be performed at the tilting posture.

Figure 19:
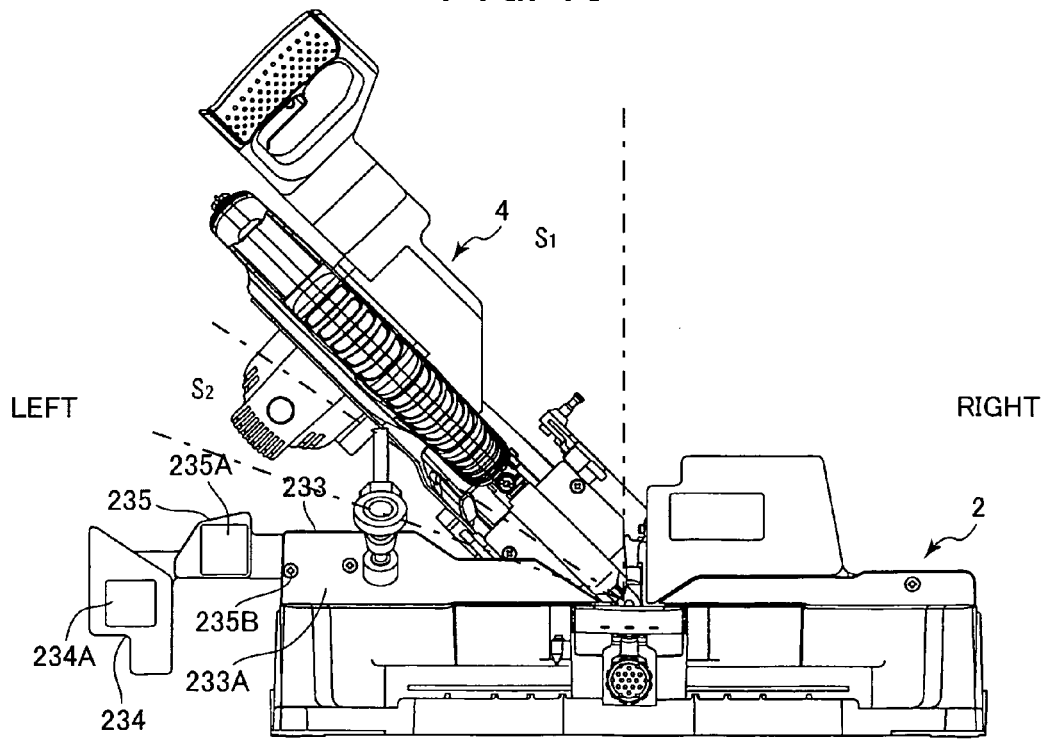
FIG. 19 is a front view showing still another bevel cutting state in which the cutting portion is further tilted leftward in the miter saw according to the first embodiment.

If the cutting portion 4 is to be further tilted from the first tilting region S1, the cutting portion 4 may be interfered with the second left subordinate fence 325. To avoid this problem, as shown in FIG. 19, the second left subordinate fence 235 is also pivotally moved to a position outside of the second tilting region S2. Thus, free tilting motion of the cutting portion 4 is achievable within the first and second tilting regions S1 and S2 without any mechanical interference.

Even if the first and second left subordinate fences 234 and 235 are positioned outside of the first and second tilting regions S1 and S2, the first and second left subordinate surfaces 234A, 235A are flush with the fixed left support surface 233A, and are positioned above the upper surface of the base portion 2. Thus, these surfaces 234A, 235A and 233A can support the workpiece. Further, since the first and second left subordinate support surfaces 234A, 235A are positioned at an extension of the fixed left support surface 233A when positioned outside of the first and second tilting regions S1 and S2 and remote from the circular saw blade, relatively elongated support surface area can be provided. This is advantageous when cutting a workpiece having an elongated side surface by abutting the elongated side surface onto the elongated support surface.

If the cutting portion 4 is to be tilted at a predetermined angle of 45.0 degrees, the user holds the cutting portion 4 with his hand and manually moves the cutting portion 4 to the position about 45 degree position while monitoring the angle display portion 223, after the clamp portion 33 is unfastened. Then, the clamp lever 333 is manipulated for threadingly advancing the clamp shaft 331 to provide the provisional fixing state of the tilt portion 31. Then, the adjustment knob 321 is manually rotated to slightly tilt the tilt portion 31 relative to the tilt support 226, so that the intended tilting position can be easily and accurately obtained. Then, the clamp lever 333 is further manipulated to provide the full fixing state between the tilt portion 31 and the tilt support 226. Thus, the tilting angle of the cutting portion 4 is fixed.

Figure 17:
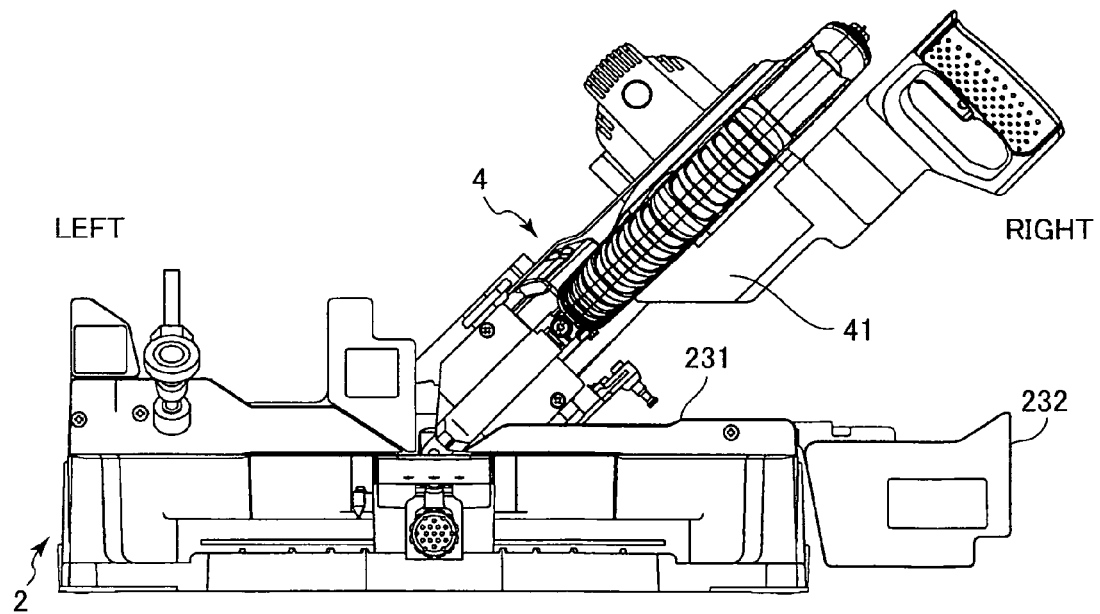
FIG. 17 is a front view showing a bevel cutting state in which the cutting portion is tilted rightward in the miter saw according to the first embodiment.

As shown in FIG. 17, if the cutting portion 4 is to be tilted rightward, the right subordinate fence 232 must be provisionally pivotally moved to the right side position. When the cutting portion 4 is tilted rightward, the portion of the gear case 41 accommodating therein the power transmission mechanism 43 may be interfered with the workpiece. Therefore, the rightward tilting amount must be smaller than the leftward tilting amount in case of an ordinary miter saw. On the other hand, in the miter saw 1 according to the depicted embodiment, a reduced distance L2 (FIG. 13) between the circular saw blade 45 and the outer side of the gear case 41 is provided. Therefore, a low probability of abutment of the gear case 41 against the workpiece can result when the rightward tilting angle is increased in comparison with the ordinary miter saw. For example, as shown in FIG. 12, when the cutting portion 4 is tilted rightward at an angle of 45 degrees, a large gap distance L3 between the gear case 41 and the surface of the base portion 2 can be provided because of the decrease in the distance L2. This makes possible to cut a thicker workpiece.

Even if the cutting portion 4 is not tilted, there may be a probability of interference of the gear case 41 with a massive workpiece if the massive portion is located rightward of the circular saw blade 45 on the base portion 2. In the latter case, in the present embodiment, a probability of interference can be lowered because of the reduced distance L2. In other words, workpieces with various size and configuration can be subjected to cutting by the miter saw 1.

Figure 20:
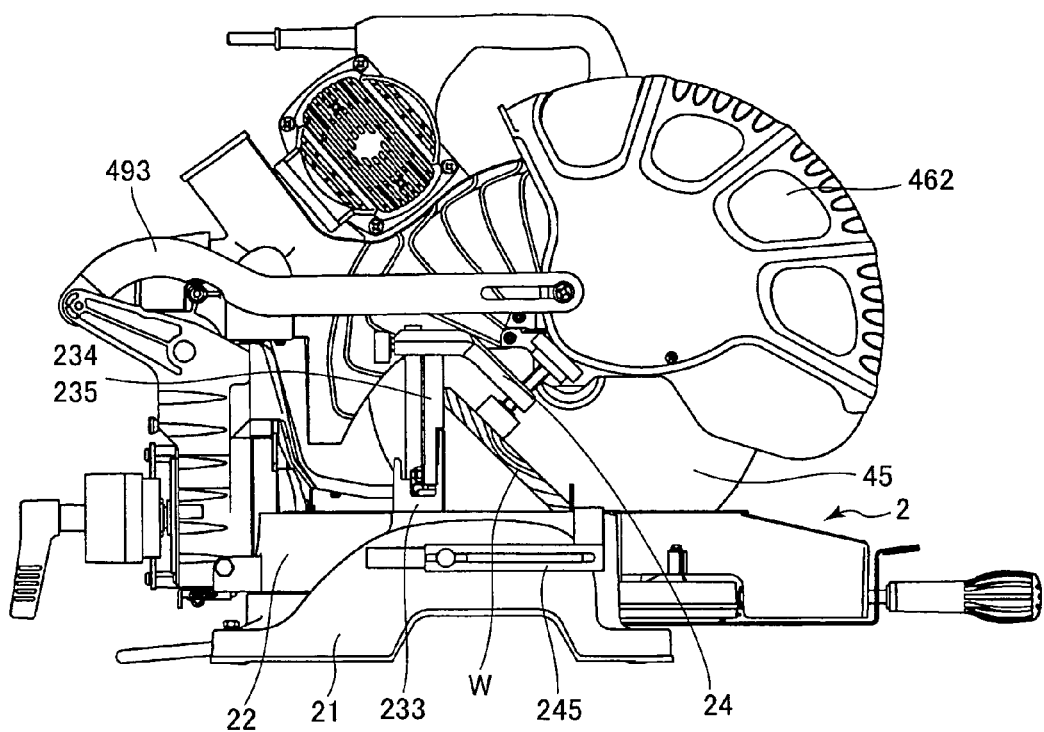
FIG. 20 is a side view showing a state of cutting a lace or braid construction material in the miter saw according to the first embodiment.

FIG. 20 shows a state of cutting a lace or braid construction material W to be attached to a boundary region between a ceiling and a vertical wall. The lace construction material W is a plate shape available for mounting on the upper surface of the base portion 2 for the purpose of ordinary cutting. However, a specific splicing side must be provided in the lace construction material to be set at a corner portion among neighboring walls and ceiling. To this effect, bevel angle (tilting angle of the cutting portion 4) and miter angle (rotation angle of the turntable 22) must be provisionally calculated so as to provide the specific slicing side.

In the fence 23 and particularly the left fence 23B according to the depicted embodiment, since the first and second subordinate fences 234 and 235 are located above the fixed left fence 233, height of the resultant left fence 23B from the surface of the base portion 2 can be increased. Accordingly, the lace construction material W can be propped onto the left fence 23B. Further, a jig 245 is provided for preventing the propped lace construction material W from moving frontward on the base portion 2. Because of the cooperation of the jig 245 and the vise unit 24, the propped posture of the lace construction material W can be fixed during cutting operation. In this cutting, only angular rotation of the turntable 22 relative to the base 21 is performed without tilting the cutting portion 4 to provide the desired splicing side.

Figure 21:
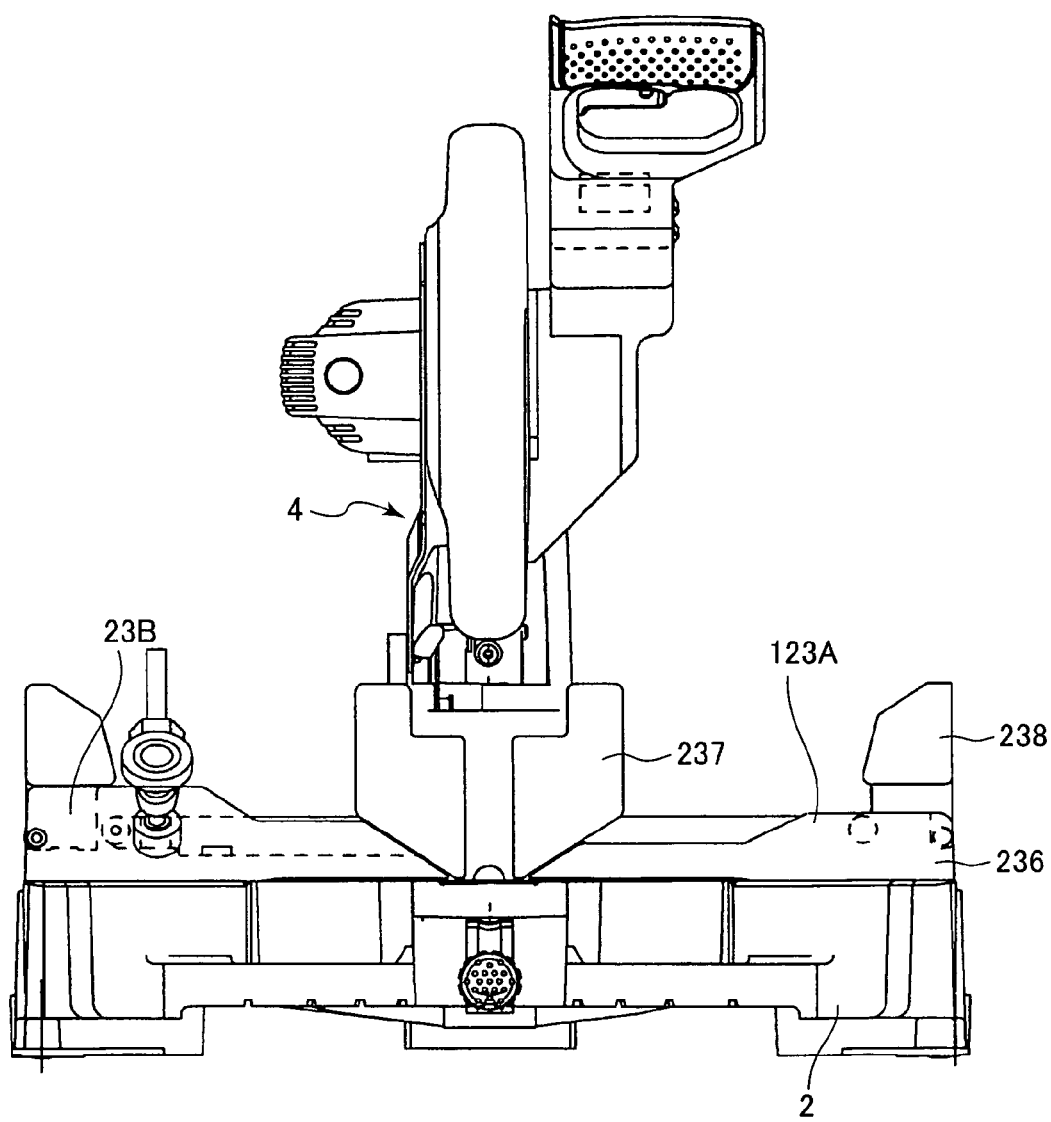
FIG. 21 is a front view of a miter saw having a modified fence according to a first modification to the first embodiment.

A first modification is shown in FIG. 21. In the first embodiment, the first and second subordinate fences are provided regarding the left fence 23B, and only the single right subordinate fence 232 is provided. In a right fence 123A of the modification, are provided a fixed right fence 236, a first right subordinate fence 237 and a second right subordinate fence 238 those similar to the left fence 23B of the first embodiment. With such arrangement, large rightward tilting angle can be provided in the miter saw having a reduced protrusion of the gear case portion, and the workpiece can be suitably supported by the elongated right fence 123A.

Figure 22:
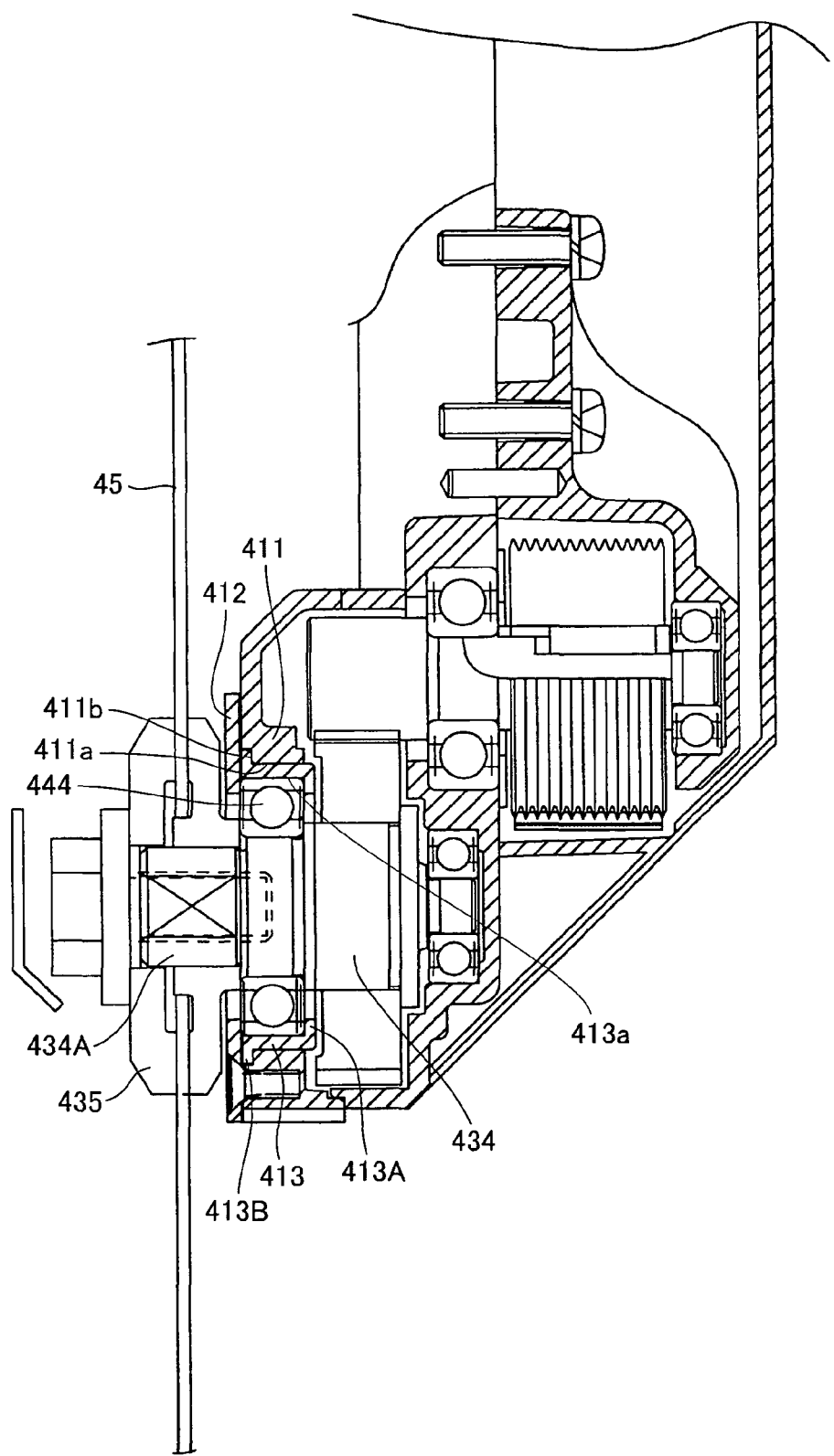
FIG. 22 is a cross-sectional view showing a modified cutting portion having a bearing holder portion according to a second modification to the first embodiment.

A second modification is shown in FIG. 22, in which a first bearing nip member 412 and a second bearing nip member 413 can be both assembled into the bearing holder 411 at the side of the circular saw blade 45. In this case, the second bearing nip member 413 is formed with a radially inward protrusion 413A by a metal-drawing method that defines a space 413a surrounding the fourth bearing 444. The second bearing nip member 413 has a flange portion 413B at a portion in contact with the first bearing nip member 412. A complementary stepped portion 411b is formed at an open end of the securing hole 411a of the bearing holder 411 to receive the flange portion 413B.

To assemble the second bearing nip member 413 into the bearing holder 411, the protrusion 413A is inserted into the securing hole 411a so that the flange portion 413B is seated onto the stepped portion 411b. Then, the fourth bearing 444 is inserted into the space 413a, and the first bearing nip member 412 is fixed to the side of the bearing holder 411, the side being facing the circular saw blade 45. With this arrangement, the fourth bearing 444 can be held by the bearing holder 411 regardless of the thickness of the bearing holder 411 as long as the second bearing nip member 413 can be fixed to the bearing holder 411. Consequently, thickness of the bearing holder 411 can further be reduced to further reduce the distance L2 (FIG. 13) of the cutting portion 4.

While the invention has been described in detail and with reference to specific embodiments thereof, it would be apparent to those skilled in the art that various changes and modifications may be made therein without departing from the spirit and scope of the invention. For example, in the first embodiment, the first left subordinate fence 234 can be selectively positioned at either within the first tilting region S1 or outside of the first and second tilting regions S1, S2. However, the fence can be selectively positioned at desirable positions in accordance with the tilting angle of the cutting portion 4, for example, at either outside of the first tilting region S1 or within the second tilting region S2.

Further, in the first embodiment, the first and second left subordinate fences 234, 235 are pivotally movable to change their positions. However, sliding arrangement is also available for changing positions to outside of first tilting region S1 and second tilting region S2.

Figure 23A:
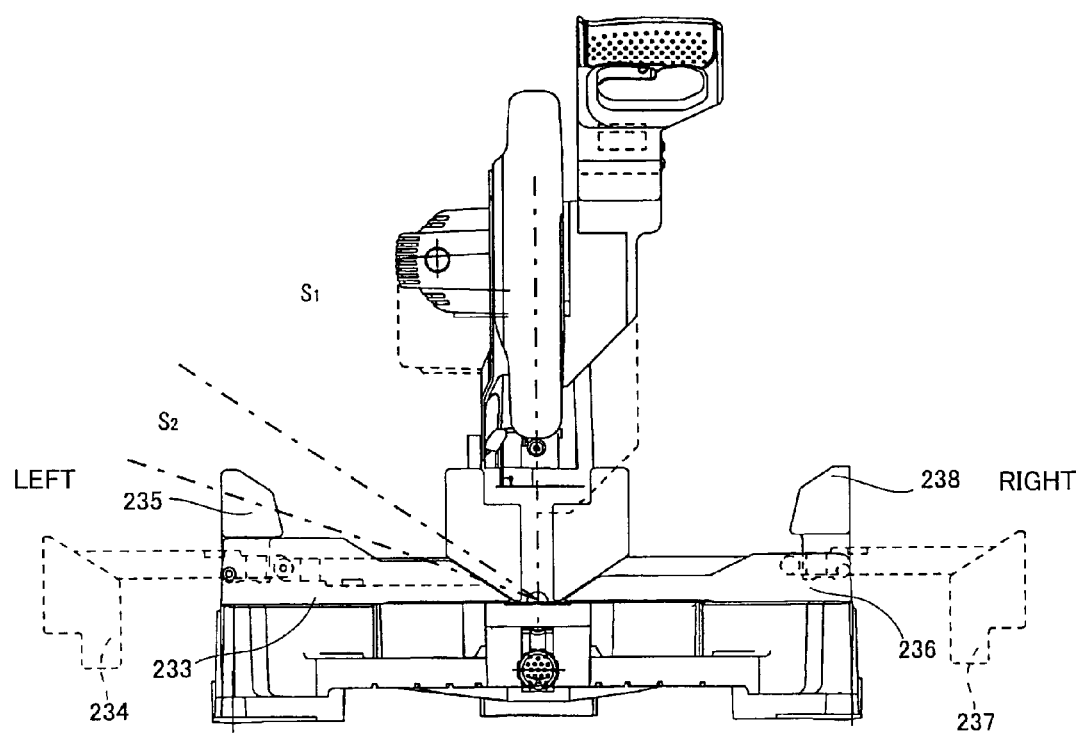
FIG. 23(a) is a front view of a miter saw having a second subordinate fence and showing a state prior to movement thereof according to a third modification to the first embodiment.
Figure 23B:
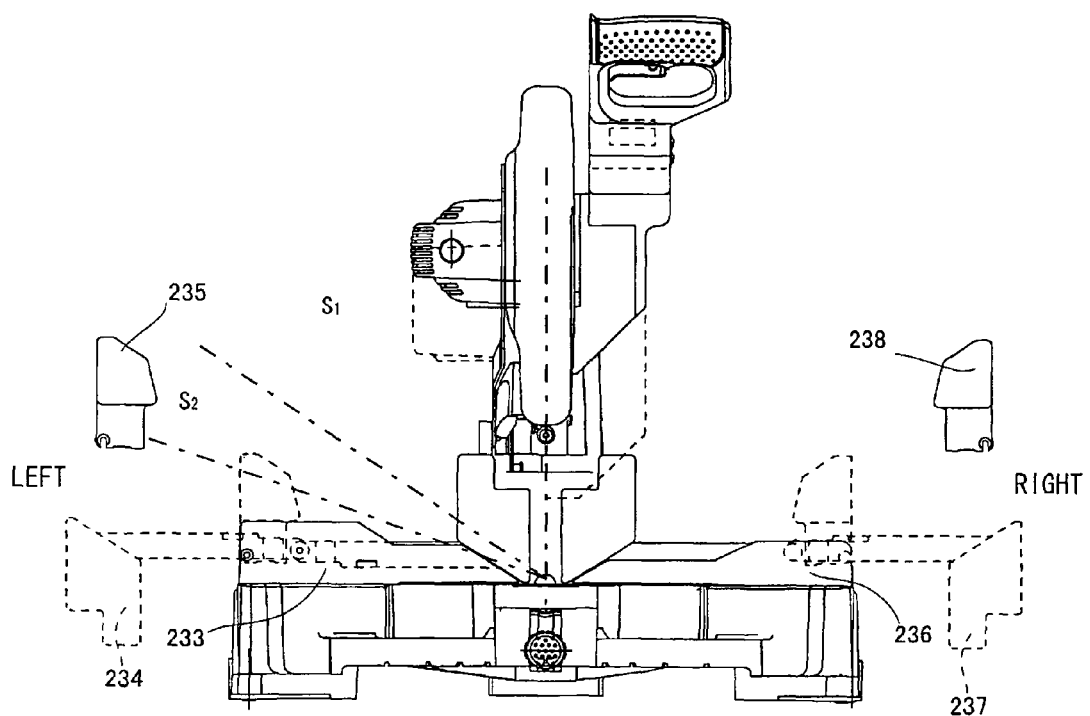
FIG. 23(b) is a front view of the miter saw having the second subordinate fence and showing a state after movement thereof according to the third modification to the first embodiment.

Furthermore, as shown in FIG. 23(a), the second left subordinate fence 235 is detachably attached to the fixed left fence 233, and as shown in FIG. 23(b), the second left subordinate fence 235 can be positioned outside of the first tilting region S1 and the second tilting region S2 by detaching the second left subordinate fence 235 from the fixed left fence 233. The same is true with respect to the right fence. That is, a second right subordinate fence 238 can be detachably attached to a fixed right fence 236 as shown in FIGS. 23(a) and 23(b).

Further, in the above-described embodiment, the subordinate fences are pivotally movably supported to the fixed fence. Instead, the subordinate fences can be pivotally movably supported to the base portion 2.

Figure 24:
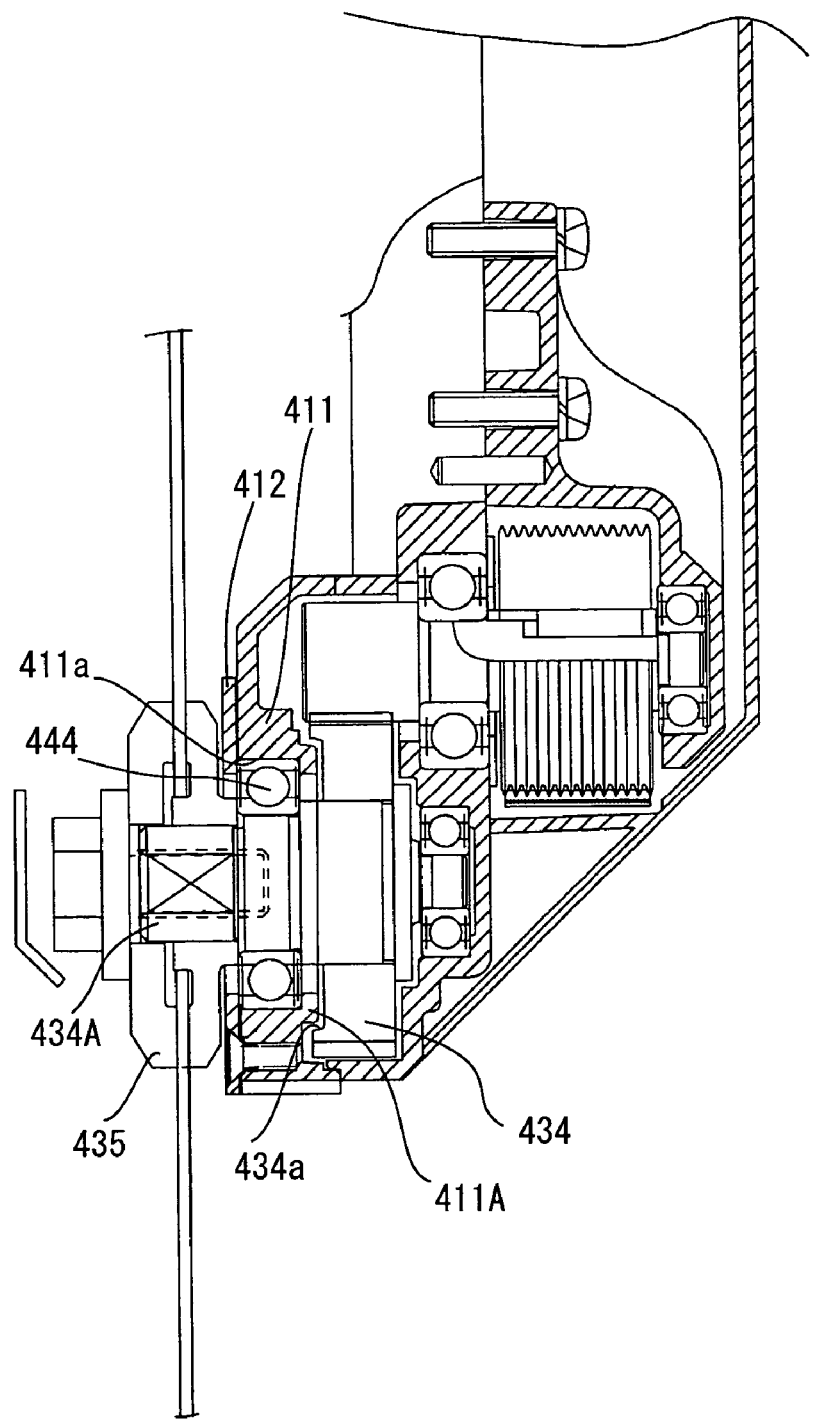
FIG. 24 is a cross-sectional view showing a further modified cutting portion having a bearing holder portion according to a fourth modification to the first embodiment.

Further modified cutting portion having a bearing holder portion according to a fourth modification to the first embodiment is shown in FIG. 24. In the first embodiment, the fourth bearing 444 is nipped between the first and second bearing nip members 412 and 413. However, according to the fourth modification, the second bearing nip member can be dispensed with. To this effect, a radially inward annular projection 411A is provided integrally with the bearing holder 411 at an open end of the securing hole 411a at a side facing the second gear 434, so that the fourth bearing 444 is nipped between the first bearing nip member 412 and the radially inward annular projection 411A. The radially inward annular projection 411A protrudes toward the second gear 434 into the circular recess 434a and is accommodated therein. With this arrangement, even if an axial length of the bearing holder is increased by the addition of the radially inward annular projection 411A, the radially inward annular projection 411A can be stored in the circular recess 434a. Thus, thickness of the bearing holder 441 at a portion other than the securing hole 411a can be reduced to reduce the distance L2 to provide a compact gear case. Because of this arrangement, a width of the gear case in the axial direction of the second gear 434 can be reduced. This width can further be reduced, by a design such that the radially inward annular projection 411A is positioned as much as possible into the circular recess 434a.

Further, a tilt portion can includes a first support section, a guide section, and a second support section. The first support section provides a tilt shaft 39 and is supported by the tilt support, so that the first support section is laterally tiltable relative to the tilt support. The second support section includes a pair of pivot support arms for pivotally movably supporting the cutting portion. The guide section extends between the first support section and the second support section for moving the second support section relative to the first support section in a direction parallel to the axial direction of the tilt shaft. In this case, the guide section is fixed to the first support section whereas the second support section is slidable relative to the guide section. Thus, the second support section is movable along the guide section. Such arrangement is described in a co-pending U.S. patent application Ser. No. 11/078,489 filed Mar. 14, 2005, which is incorporated by reference. Alternatively, the second support is fixed to the guide section whereas the guide section is slidable relative to the first support section. Thus, the second support section and the guide section are movable relative to the first support section. Accordingly, cutting range to the workpiece in the axial direction of the tilt shaft can be increased. Such arrangement is described in co-pending U.S. patent application Ser. No. 09/930,442 filed Aug. 16, 2001, and Ser. No. 10/796,032 filed Mar. 10, 2004 which are also incorporated by reference.

What is claimed is:

1. A miter saw comprising:
   a base portion on which a workpiece is to be mounted;
   a cutting portion supporting a circular saw blade and movable toward and away from the base portion, the cutting portion comprising:
   a gear case serving as an outer frame and having a bearing holder formed with a bearing holding hole having first and second open ends;
   a motor for driving the circular saw blade;
   a power transmission mechanism disposed in the gear case for transmitting rotation of the motor to the circular saw blade, the power transmission mechanism including a spindle having one end provided with a blade fixing section, and another end provided with a drive gear;
   a bearing including an outer race fitted in the bearing holding hole of the bearing holder and disposed between the blade fixing section and the drive gear for rotatably supporting the spindle to the gear case, the first open end of the bearing holding hole facing the circular saw blade and the second open end facing the drive gear;
   a first bearing nip member disposed to cover at least a part of the first open end to hold one axial end of the bearing;
   a second bearing nip member disposed to cover at least a part of the second open end to hold another axial end of the bearing;
   wherein the first bearing nip member and the second bearing nip member are formed of a material having a mechanical strength higher than that of a material of the bearing holder and are fixed to the bearing holder;
   wherein the bearing holder has a first side facing the circular saw blade and a second side facing the drive gear;
   wherein the bearing holder has an inner face facing the bearing, and said bearing holder has a thickness defined at said inner face between the first side and the second side, the thickness being less than an axial length of the bearing;
   wherein the drive gear has one axial side facing toward the second side of the bearing holder and the second bearing nip member, the one axial side being formed with a recess; and
   wherein the second bearing nip member has a part protruding toward the recess and holding the another axial end of the bearing, a gap being defined between the protruding part and the recess.

2. The miter saw as claimed in claim 1, wherein the first bearing nip member is fixed to the first side of the bearing holder, and the second bearing nip member is also fixed to the first side of the bearing holder.

3. The miter saw as claimed in claim 2, wherein the second bearing nip member has a flange section in contact with the first bearing nip member, a cylindrical section extending through the bearing holding hole, and a radially inward annular projecting section facing the drive gear, and forming said protruding part.

4. The miter saw as claimed in claim 1, wherein the circular saw blade has one circular side and another circular side opposite thereto, a lateral direction being defined in a direction to connect the one circular side to the another circular side, and
   wherein the cutting portion is tiltable with respect to the base portion in the lateral direction.

5. The miter saw as claimed in claim 1, wherein the first bearing nip member is fixed to the first side of the bearing holder, and the second bearing hip member is fixed to the second side of the bearing holder.

6. The miter saw as claimed in claim 1,
   wherein the first bearing nip member is in contact with one axial end of the outer race, and the second bearing nip member is in contact with another axial end of the outer race.

7. The miter saw as claimed in claim 1, wherein the base portion has a tilt support, and the miter saw further comprising
   a support portion that pivotally movably supports the cutting portion toward and away from the base portion, the support portion being in contact with the tilt support and laterally tiltingly movably supported to the tilt support to laterally tiltingly move the cutting portion,
   a clamp unit that urges one of the support portion and the tilt support toward remaining one of the support portion and the tilt support to fix a laterally tilting posture of the cutting portion; and
   a bevel angle fine adjustment mechanism for adjusting tiltingly moving amount of the support portion with respect to the tilt support, the fine adjustment mechanism comprising:
   an adjustment knob providing a rotary motion about a central axis; and
   a deceleration mechanism drivingly connected to the adjustment knob for converting the rotary motion into a relative tilting motion between the support portion and the tilt support, the deceleration mechanism having a center axis coincident with the central axis.

8. The miter saw as claimed in claim 1, wherein the protruding part is concentric with the recess.

* * * * *